United States Patent [19]
Song

[11] Patent Number: 6,072,541
[45] Date of Patent: Jun. 6, 2000

[54] VIDEO/AUDIO SIGNAL SWITCHING CIRCUIT AND METHOD

[75] Inventor: Moon-Jong Song, Kyungki-do, Rep. of Korea

[73] Assignee: SamSung Electronics Co., Ltd., Kyungki-do, Rep. of Korea

[21] Appl. No.: 08/922,748

[22] Filed: Sep. 3, 1997

[30] Foreign Application Priority Data

Sep. 3, 1996 [KR] Rep. of Korea ........................ 96-38103
Dec. 31, 1996 [KR] Rep. of Korea ........................ 96-80898

[51] Int. Cl.$^7$ ....................................................... H04N 5/44
[52] U.S. Cl. ............................ 348/706; 348/555; 348/563
[58] Field of Search ................................... ; 348/564, 565, 348/706, 725, 705, 553, 563, 555, 556, 557; 358/181, 188; H04N 5/445, 5/44, 5/268

[56] References Cited

U.S. PATENT DOCUMENTS 4,837,623  6/1989  Motoyama ................................ 348/633

FOREIGN PATENT DOCUMENTS

| 57-101480 | 6/1982 | Japan | 358/188 |
| 58-84576 | 5/1983 | Japan | 358/188 |
| 61-84976 | 4/1986 | Japan | H04N 5/445 |
| 62-84663 | 4/1987 | Japan | H04N 5/440 |
| 63-236481 | 10/1988 | Japan | H04N 5/440 |
| 3-163973 | 7/1991 | Japan | H04N 5/44 |
| 4-219081 | 8/1992 | Japan | H04N 5/268 |
| 5-268537 | 10/1993 | Japan | H04N 5/44 |

*Primary Examiner*—David E. Harvey
*Attorney, Agent, or Firm*—Robert E. Bushnell, Esq.

[57] ABSTRACT

A video signal switching circuit according to the present invention provides a video signal switching circuit to thereby display various kinds of video signal by using a monitor.

In addition, a video/audio signal switching circuit and method according to the present invention can selectively output a TV audio signal, a VCR audio signal and PC audio signal in a monitor including TV reception and video functions, to thereby reduce loads of the body of a multimedia computer.

15 Claims, 13 Drawing Sheets

VIDEO/AUDIO SIGNAL SWITCHING CIRCUIT AND METHOD

CLAIM OF PRIORITY

This application makes reference to, incorporates the same herein, and claims all benefits accruing under 35 U.S.C. §119 from the two applications both entitled VIDEO/AUDIO SIGNAL SWITCHING CIRCUIT AND METHOD earlier filed in the Korean Industrial Property Office on Sep. 3, 1996 and Dec. 31, 1996 and there duly assigned Ser. No. 38103/1996 and 80898 respectively.

BACKGROUND OF THE INVENTION

1. Field of the Invention

The present invention relates to a video/audio signal switching circuit and method, and more particularly, to a video/audio signal switching circuit and method that is capable of selectively transferring as output signals, video and audio signals inputted from a source external to a monitor.

2. Related Art

Recently, new computer models have been gradually developed to be integrated with an audio, a video, a television, a game machine, a communication equipment, including simple four arithmetical operations and data base function. A computer assembled with hardware through which the audio, video, television, game machine and communication equipment functions are embodied is generally called "a multimedia computer". As such multimedia computers are widespread in many areas, home appliances are now being replaced with the multimedia computers. For example, an existing video cassette recorder may be replaced with a CD ROM (compact disk read only memory) which is mounted on the multimedia computer. Further, if digital satellite broadcasting fashion is widely enlarged, it is expected that the computer can perform existing radio and satellite television functions.

On the multimedia computer with a multifunctioning feature, a sound card is mounted for processing a sound signal as well as an existing protocols for video signals. The monitor, which displays data from the multimedia computer on which the sound card is embedded, has various functions to be used by the multimedia function. For example, there is presented a novel monitor into which a speaker is integrated as a unitary body.

Since the multimedia computer should require the installation of a TV receiving card, a video card, a facsimile and communication card and so on, in order to provide various functions such as TV, video and facsimile, I have found that there is a problem because existing designs are unable to selectively output a video/audio signal transmitted from the computer body or an external signal generating device, in a monitor of the computer.

SUMMARY OF THE INVENTION

Accordingly, the present invention is directed to a video/audio signal switching circuit and method that substantially obviates one or more of the problems due to limitations and disadvantages of the related art.

It is an object of the present invention to provide an improved video audio signal switching circuit and process.

It is another object to provide a video signal switching circuit which can selectively output a video signal outputted from a VCR, a game machine, a personal computer and a TV, in a monitor.

It is still another object to provide a video/audio signal switching circuit and method which can selectively output a TV audio signal, a VCR audio signal and PC audio signal in a monitor including TV reception and video function, and thereby reduce the load on the body of the multimedia computer.

To accomplish these and other objects of the present invention, these is provided a video/audio signal switching circuit that may be constructed with: a video composite signal selector that selects a video signal from a TV tuner and a VCR; a chroma integrated circuit (IC) that synthesizes the video signal selected from the video composite signal selector and adjusts the chrominance of the synthesized signal, a double scan stage that receives the video signal from the chrome IC and modulates the video signal to a monitor frequency; a video signal switching circuit that receives a TV video signal and a VCR video signal from the double scan stage, a game machine video signal from a game machine, and a PC video signal from a PC and switches each of the received video signals; a video preamplifier and a video main amplifier that each amplify the video signal from the video signal switching circuit to display the signal on a CRT; an audio selection means which receives sound signals each from the VCR, the game machine, the PC and the TV tuner and selects each of the sound signals; and an audio preamplifier and an audio main amplifier that each amplify the sound signal from the sound selector to output the signal on a speaker.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED DOCUMENT

An explanation of the speaker integrated monitor will be discussed with reference to FIG. 1.

Figure 1:
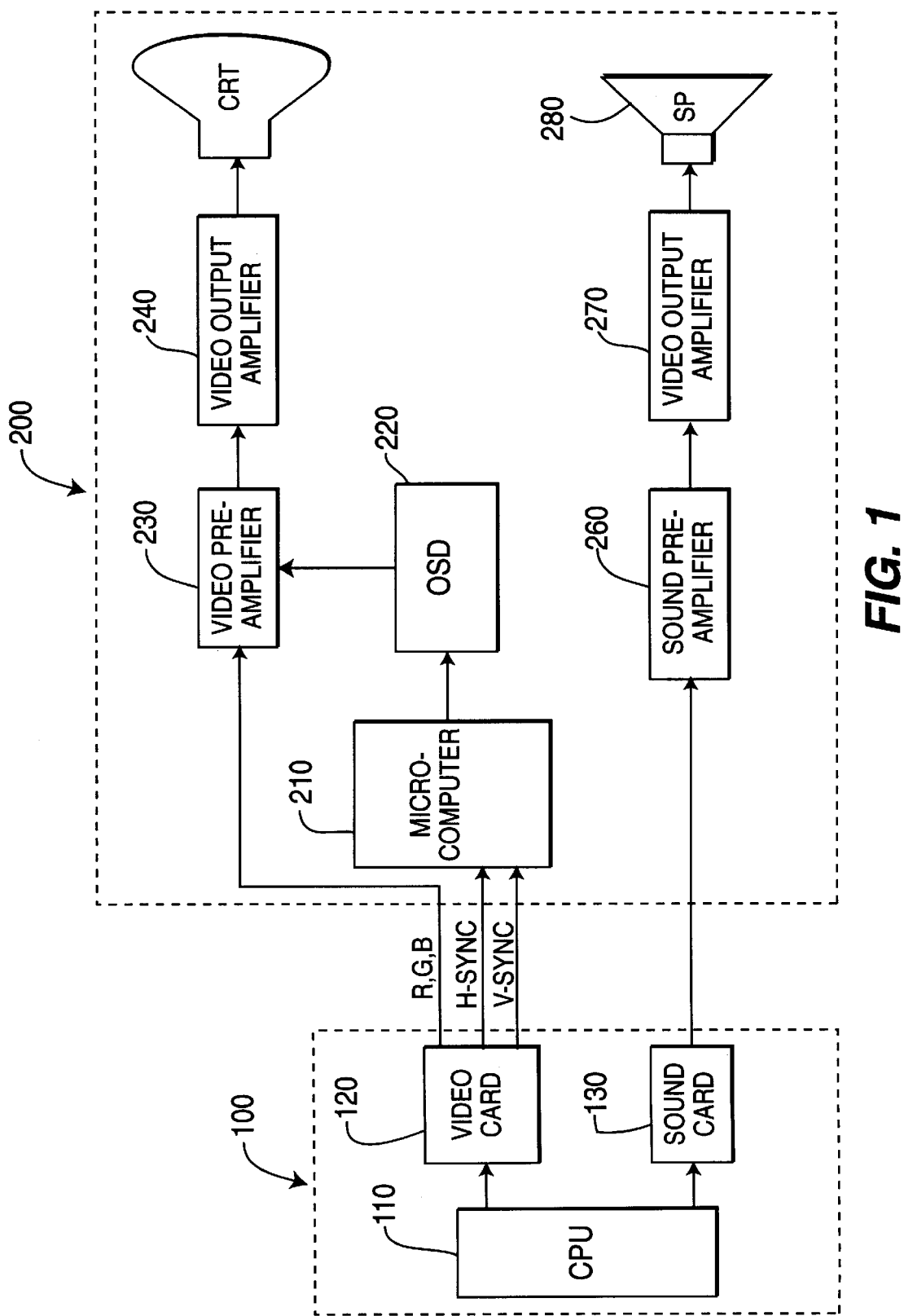
FIG. 1 is a block diagram illustrating an internal circuit construction of a representative speaker integrated monitor.

Turning now to the drawings, FIG. 1 is a block diagram illustrating an internal circuit construction of a representative speaker integrated monitor. In construction, a central processing unit (hereinafter, referred to as "CPU") 110 processes a program having video and sound data to thereby output a video control signal and a sound control signal. A video card 120 receives the video control signal outputted from the CPU 110 to output video signals (R, G and B), and a sound card 130 receives the sound control signal outputted from the CPU 110 and processes the sound data of the program having video and audio data to output a sound signal. A microcomputer 210 receives a horizontal synchronous signal H-SYNC and a vertical synchronous signal Y-SYNC from the video card 120 to thereby output an on screen display (hereinafter, referred to as "OSD") gain signal according to a monitor screen control signal and OSD data. An OSD 220 receives the OSD gain signal outputted from the microcomputer 210 to perform an OSD process for the signal, and a video preamplifier 230 receives the OSD signal from the OSD 220 and the video signals (R, G and B) from the video card 120 to amplify the signals by a predetermined level. A video output amplifier 240 finally amplifies the video signals (R, G, and B) and the OSD signal selectively outputted from the video preamplifier 230, a cathode ray tube (hereinafter, referred to as "CRT") displays the video signals (R, G and B) and the OSD signal outputted from the video output amplifier 240. A sound preamplifier 260 receives the sound signal from the sound card 130 to amplify the signal by a predetermined level, a sound output amplifier 270 receives the sound signal from the sound preamplifier 260 to finally amplify the signal, and a speaker 280 receives the sound signal outputted from the sound output amplifier 270 to output the sound signal.

In operation, many programs having video data and audio data such as game or motion-picture program using a computer are recently produced. If the programs are executed, the CPU 110 within a computer body 100 receives an execution command and outputs the video signals (R, G and B) and the sound signal through the video card 120 and the sound card 130, respectively, based upon the received execution command.

The video card 120 receives the video signals from the CPU 110 and processes the video data to output the video signals (R, G and B). The video preamplifier 230 within a monitor 200 receives the video signals (R, G and B) from the video card 120 and amplifies the signals by a predetermined level. At the time, the video card 120 outputs the horizontal synchronous signal H-SYNC and the vertical synchronous signal Y-SYNC which are each used to synchronize the video signals (R, G and B). The microcomputer 210 within the monitor 200 receives the horizontal synchronous signal H-SYNC and the vertical synchronous signal Y-SYNC.

After receiving the horizontal synchronous signal H-SYNC and the vertical synchronous signal Y-SYNC, the microcomputer 210 generates a monitor screen control signal according to a prestored data. At the time, the microcomputer 210 generates the OSD data according to the control signal to output the generated data as the OSD gain signal. The video preamplifier 230 receives the OSD gain signal and also receives the video signals (R, G and B) from the video card 120.

The video preamplifier 230 receives all of the OSD gain signal and the video signals (R, G and B) and amplifiers the signals by a predetermined level. The amplified signals are finally reamplified by the video output amplifier 240. At the time, the OSD gain signal and the video signals (R, G and B) from the video preamplifier 230 are selectively outputted in accordance with an OSD selection signal.

For instance, if the OSD selection signal is applied to the video preamplifier 230, the video preamplifier 230 outputs the OSD signal. The OSD signal outputted from the video preamplifier 230 is finally amplified by the video output amplifier 240 and is displayed on the CRT 250. When the OSD signal is displayed on the CRT 250, a user controls the monitor screen state.

To the contrary, if the OSD selection signal is not applied to the video preamplifier 230, the video preamplifier 230 outputs the video signals (R, G and B). The video signals (R, G and B) outputted from, the video preamplifier 230 are finally amplified by the video output amplifier 240 and are displayed on the CRT 250.

On the other hand, the sound card 130 which receives the sound data from the CPU 110 processes the sound data as the sound signal. The sound signal from the sound card 130 is amplified by the sound preamplifier 260 up to a predetermined level. The sound output amplifier 270 finally amplifies the sound signal by a predetermined level. The sound signal outputted from the sound output amplifier 270 is outputted as an audible sound signal through the speaker 280.

Reference will now be made in detail to the preferred embodiments of the present invention, examples of which are illustrated in the accompanying drawings.

Figure 2:
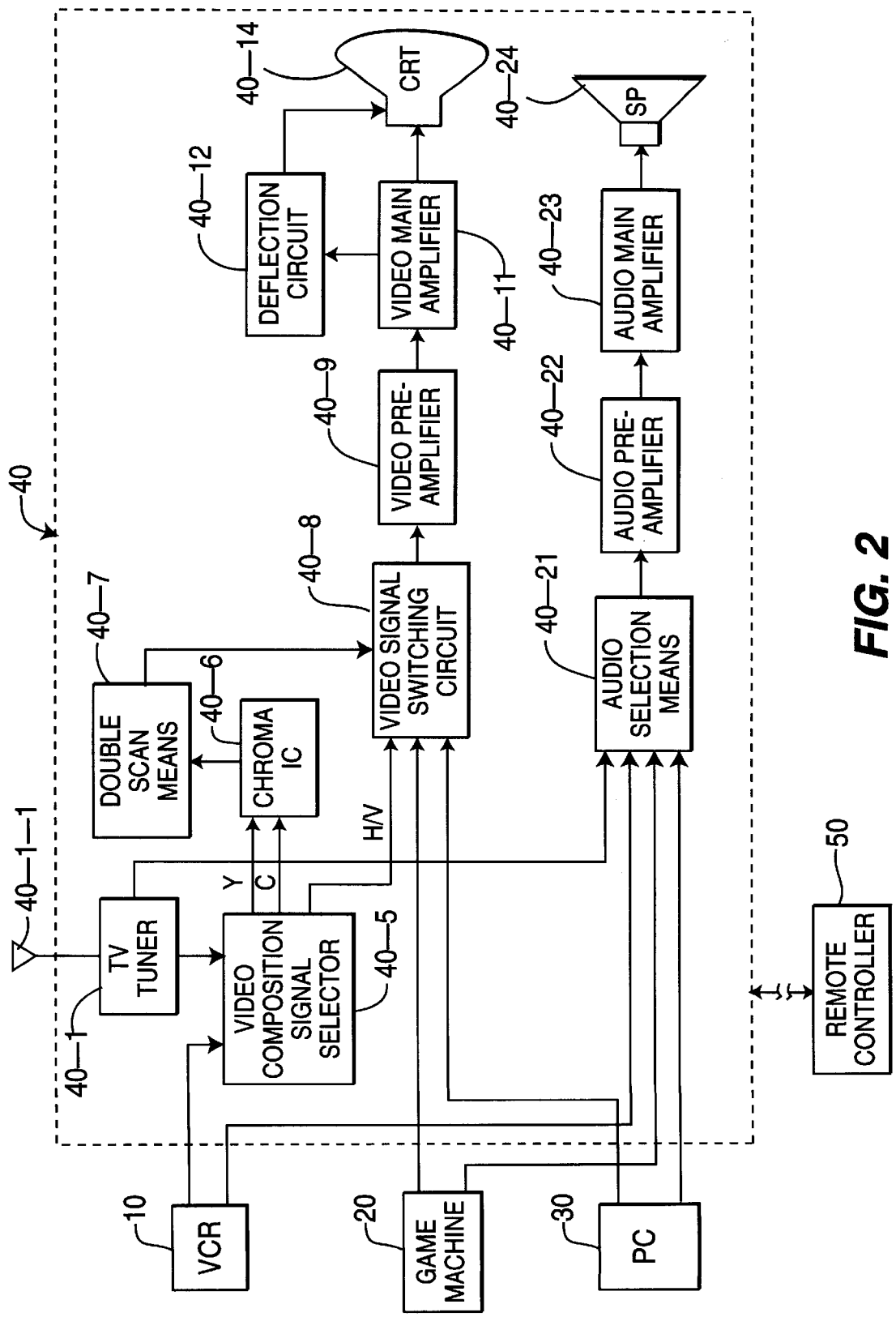
FIG. 2 is a block diagram illustrating an internal construction of a monitor in which a video/audio signal switching circuit constructed according to the principles of the present invention is contained.

FIG. 2 is a block diagram illustrating an internal construction of a monitor in which a video/audio signal switching circuit according to the present invention is contained. In construction, a video cassette recorder (hereinafter, referred to as "VCR") 10 decodes a video signal stored in a video tape and a VCR video signal and a VCR audio signal. A game machine 20 executes a game program and outputs a game machine video signal and a game machine audio signal according to the executed result of the game program, and a personal computer (hereinafter, referred to as "PC") 30 executes a computer program and outputs a PC video signal and a sound signal according to the executed result of the computer program. A TV tuner 40-1 selects a TV broadcasting frequency applied from a TV receiving antenna 40-1-1 which senses the TV broadcasting frequency and thereby outputs a TV video signal and a TV sound signal, and a video composite signal selector 40-5 selects the video signal outputted from the TV tuner 40-1 and the VCR 10. A chroma integrated circuit (hereinafter, referred to as "IC") 40-6 synthesizes the video signal selected from the video composite signal selector 40-5 and adjusts the chrominance of the synthesized signal, and a double scan means 40-7 receives the video signal outputted from the chroma IC 40-6 and modulates the video signal to a monitor frequency. A video signal switching circuit 40-8 receives the TV video signal and the VCR video signal adjusted from the double scan means 40-7, the game machine video signal from the game machine 20, and the PC video signal from the PC 30 and switches each of the received video signals. A video preamplifier 40-9 amplifies the video signal outputted from the video signal switching circuit 40-8 by a predetermined level, and a video main amplifier 40-11 finally amplifies the video signal from the preamplifier 40-9. A deflection circuit 40-12 supplies a deflection current which synchronizes the video signal outputted from the video main amplifier 40-11, and a CRT 40-14 receives the video signal outputted from the main amplifier 40-11 and displays the received signal. An audio selection means 40-21 receives sound signals each outputted from the VCR 10, the game machine 20, the PC 30 and the TV tuner 40-1 and selects each of the sound signals, and an audio preamplifier 40-22 amplifies the sound signal outputted from the sound selection means 40-21 by a predetermined level. An audio main amplifier 40-23 finally amplifies the sound signal outputted from the audio preamplifier 40-22, and a speaker 40-24 finally outputs the sound signal outputted from the audio main amplifier 40-23. A remote controller 50 outputs control signals for each controlling inputs/outputs of the TV video and sound signals, the VCR video and sound signals, the PC video and sound signal and the game machine video and sound signal and a monitor 40. In operation, the TV tuner 40-1 receives the TV video frequency from the TV antenna 40-1-1 which receives the TV broadcasting signal and amplifies the receives TV frequency to output the TV video signal and the TV sound signal, respectively. The TV video signal outputted from the TV tuner 40-1 and the VCR video signal outputted from the VCR 10 are inputted to the video composite signal selector 40-5.

The inputted TV video signal and the VCR video signal are selectively outputted from the video composite signal selector 40-5 by a user's selection. For instance, the user selects the TV video signal by using the remote controller 50, the video composite signal selector 40-5 outputs the TV video signal, and contrarily, if the VCR video signal is selected, outputs the VCR video signal.

The TV video signal inputted to the video composite signal selector 40-5 is inputted as a composite signal selector 40-5 is inputted as a composite signal made by superposing a synchronous signal, and the VCR video signal is divided into a chrominance signal and a luminance signal and the divided signals are inputted. Further, a signal bandwidth, and horizontal and vertical deflection frequencies of the VCR video signal are defined according to the specifications of a signal system (NTSC, PAL and SECAM).

The composite signal is restricted by the video signal and the horizontal and vertical synchronous signals outputted from the deflection circuit 40-12 and also has a difficulty in freely selecting the frequency in the video bandwidth, chrominance carrier, and the horizontal and vertical deflection frequencies. Further, the VCR video signal is divided into the chrominance signal and the luminance signal and the divided signals are inputted.

The video composite signal selector 40-5 receives the TV video signal and the VCR video signal and selects one of the TV video signal and the VCR signal by using a switching stage, a synchronous signal separator, and a combinational filter (not shown) within the video composite signal selector 40-5.

Figure 3:
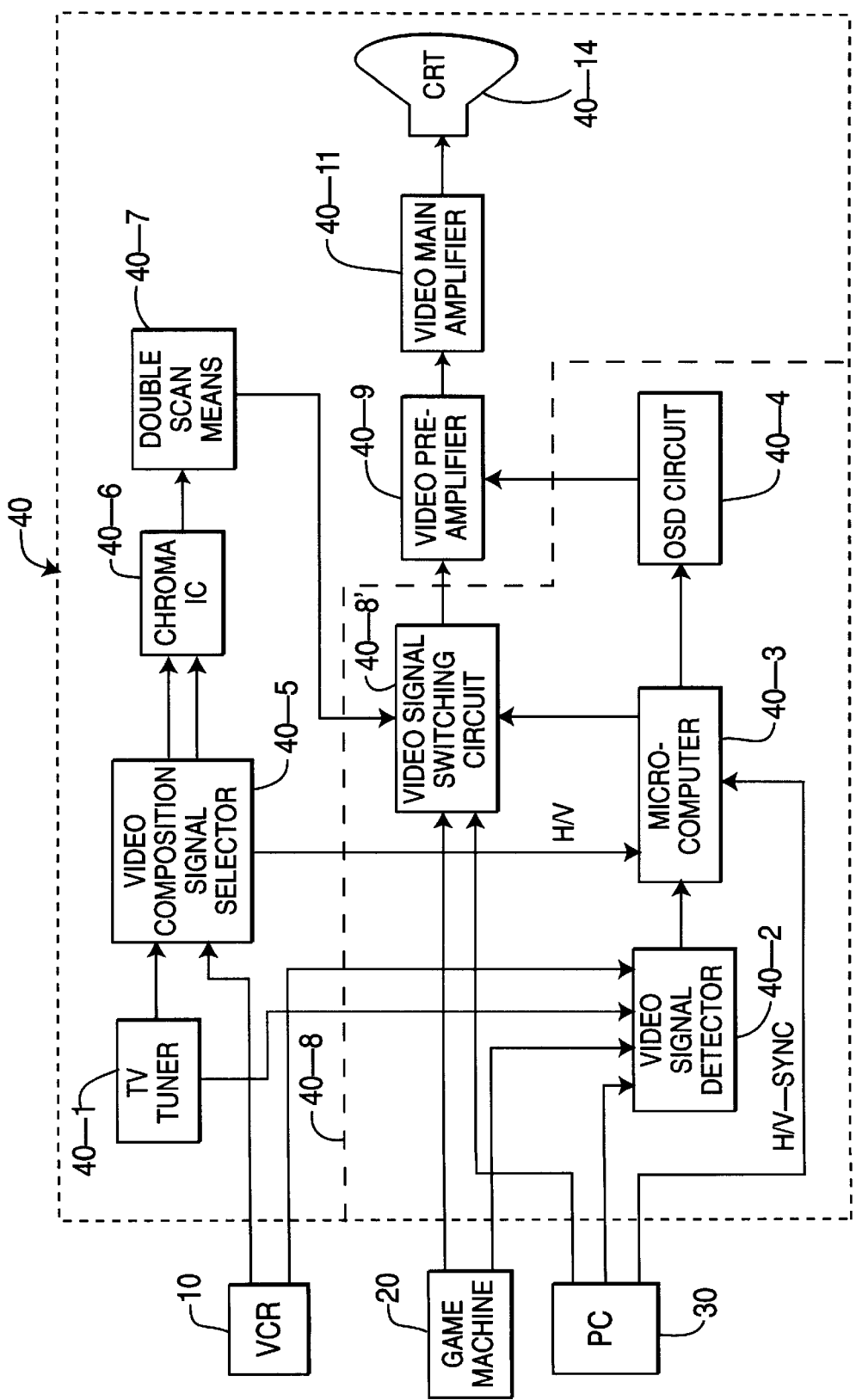
FIG. 3 is a detailed block diagram illustrating a video signal switching circuit of FIG. 2.
Figure 4:
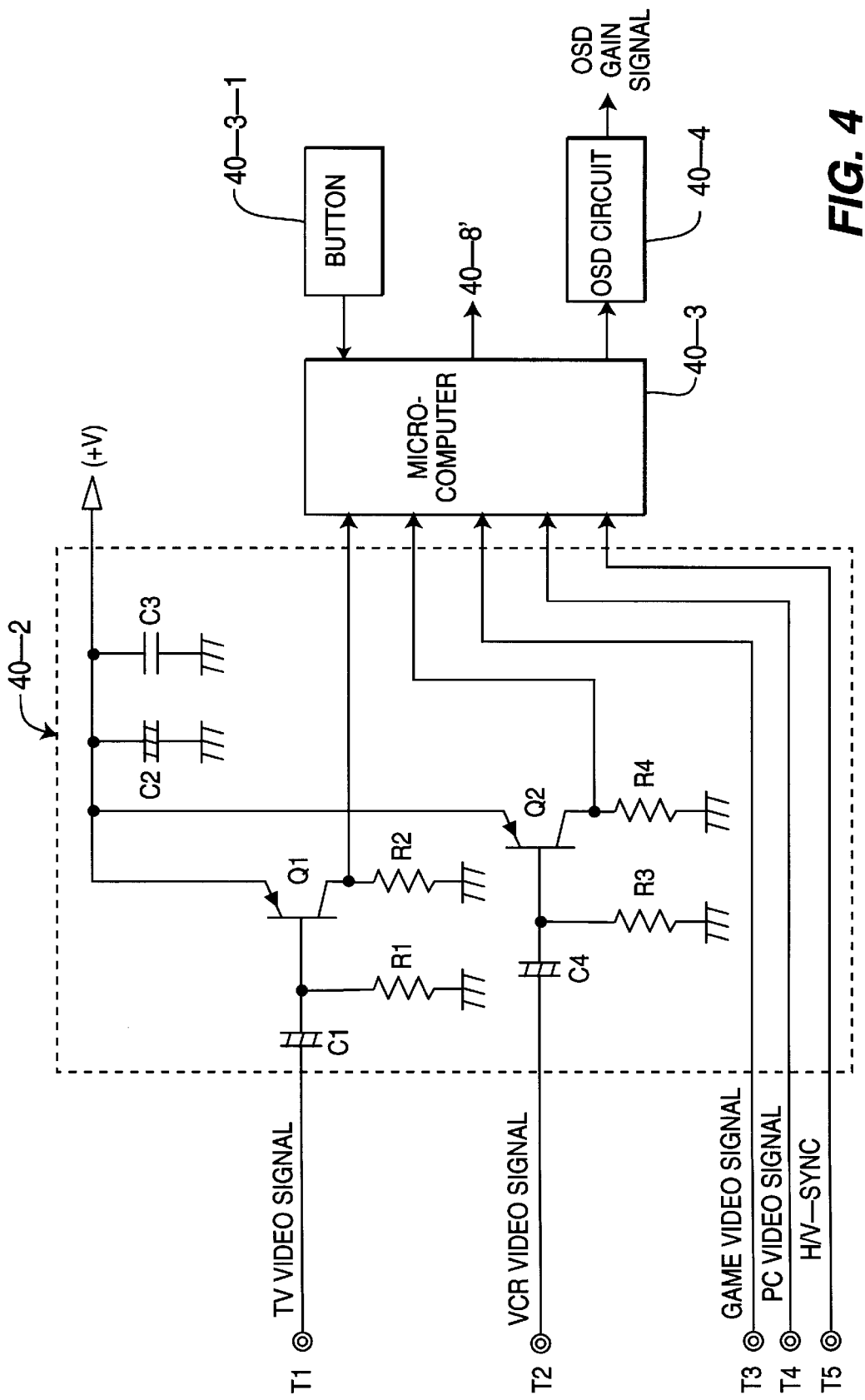
FIG. 4 is a detailed circuit diagram illustrating a video signal detector of FIG.3.

For example, if the TV video signal is selected by the switching means, the synchronous signal from the selected TV composite signal is separated by the synchronous signal separator, and the separated synchronous signal is applied to a horizontal and vertical circuit (not shown) within the monitor 40 via a microcomputer (FIGS. 3 and 4). Meanwhile, the TV composite signal excepting for the synchronous signal is divided into the chrominance signal and the luminance signal. The luminance signal is applied to the chroma IC 40-6, and the chrominance signals applied to the switching stage.

The switching stage, which receives the chrominance signal of the TV tuner 40-1, applies the chrominance signal outputted from the T.V. tuner 40-1 from which the synchronous signal is separated, to the chroma IC 40-6. The switching stage selects any one of the chrominance signal of the TV and the chrominance signal of the VCR 10. Since the TV composite signal is selected, the switching, stage turns on the chrominance signal of the TV which is applied from the combinational filter.

Accordingly, the chroma IC 40-6 receives the chrominance signal and the luminance signal from the TV tuner 40-1 and synthesizes the signals to output signals R, G and B or signals Y, R-Y and B-Y. The output signals are processed through the double scan means 40-7 to display the signals on a wide screen. That is, the signals R, G, and B or chrominance output signals Y, R-Y and B-Y are converted into digital signals by using an analog to digital converter (not shown).

The chrominance signal, which is converted into the digital signal, is reconverted into a screen signal having a screen ratio of width to length of 16×9 from a screen ratio of width to length of 4×3, via an aspect ratio conversion circuit (not shown). Then, the converted screen signal is converted into an analog signal through the double scan means 40-7 and a digital to analog converter (not shown), to thereby achieve a video signal which has an aspect ratio of 9:16 and is frequency-multiplied.

On the other hand, if the VCR video signal is selected by the video composite signal selector 40-5, the luminance signal from the VCR video signal is selected and is inputted via the combinational filter to the chroma IC 40-6. Further, the synchronous signal from the chrominance signal is separated and is inputted to the microcomputer, and the chrominance signal from which the synchronous signal is separated is applied to the switching stage.

The switching stage, which receives the chrominance signal from which the synchronous signal is separated, inputs the chrominance signal of the VCR 10 to the chroma IC 40-6. The chroma IC 40-6 receives the chrominance signal and the luminance signal of the VCR 10 and synthesizes the signals to output signals R, G and B or signals Y, R-Y and B-Y.

The output signals are converted into an analog signal through the double scan means 40-7 and the digital to analog converter, to thereby achieve a video signal which has an aspect ratio of 9:16 and is frequency-multiplied. The TV and VCR video signals which are frequency-multiplied by using the double scan means 40-7 are switched through the video signal switching circuit 40-8.

The video signal switching circuit 40-8 outputs the TV or VCR video signal, if the TV or VCR video signal is selected, and outputs the PC video signal, if the PC video signal is selected. When the PC video signal, the TV video signal or the VCR video signal is selected, the selected signal is applied to the video preamplifier 40-9.

The video preamplifier 40-9 receives the PC video signal, the TV video signal or the VCR video signal and amplifies the inputted video signal by a predetermined level to output the amplified video signal. The outputted video signal is finally amplified by the video main amplifier 40-11 and is then applied to the CRT 40-14.

The applied video signal is displayed on the CRT 40-14 by the deflection current which is applied from the deflection circuit 40-12. Further, the game machine video signal outputted from the game machine 20 is outputted to the CRT 40-14 in the same manner as the above PC video signal outputted from the PC 30.

On the other hand, the sound signals outputted from the TV tuner 40-1, the VCR 10, the game machine 20 and the PC 30 are selected by the audio selection means 40-21. The audio selection means 40-21 selects each of the sound signals by a user's selection. The selected sound signal from the audio selection means 40-21 is amplified by the audio preamplifier 40-22 and the audio main amplifier 40-23 and is then outputted to the speaker 40-24.

Firstly, the selection and processing operations of the video signal will be in detail discussed with reference to with reference to FIG. 3.

FIG. 3 is a detailed block diagram illustrating a video signal switching circuit of FIG. 2. In construction, the TV tuner 40-1 within the monitor 40 receives the TV broadcasting frequency and outputs the TV video signal according to the TV broadcasting frequency, and the VCR 10 reproduces a video signal recorded to a video signal recording medium such as a video tape and outputs the VCR video signal. The game machines 20 executes the game program and outputs the game machine video signal according to the executed game program, and the PC 30 executes a motion picture program and outputs the PC video signal and the horizontal and vertical synchronous signals H-SYNC and V-SYNC for synchronizing the PC video signal according tot e executed result of the program. A video signal detector 40-2 senses outputs of the TV video signal, the VCR video signal, the game machine video signal and the PC video signal and outputs the sensed video signal, and a microcomputer 40-3 receives the video signal from the video signal detector 40-2 and the horizontal and vertical synchronous signals H-SYNC and V-SYNC from the PC 30 to read the received signals, outputs a video selection signal and generates the OSD data according tot he selected video signal. The video composite signal selector 40-5 receives and selects the TV video signal from the TV tuner 40-1 and the VCR video signal from the VCR 10 and outputs the selected video signal, and the chroma IC 40-6 receives the video signal selected from the video composite signal selector 40-5 and adjusts the chrominance of the synthesized signal. The video signal switching circuit 40-8' receives the video signal from the chroma IC 40-6, the game machine video signal from the game machine 20, and the PC video signal from the PC 30 and switches each of the received video signals according to the video selection signal. An OSD circuit 40-4 receives the OSD data according to the video signal selection outputted from the microcomputer 40-3 and outputs an OSD gain signal, and the video preamplifier 40-9 selectively amplifies the OSD gain signal outputted from the OSD circuit 40-4 and the video signal outputted from the video signal switching circuit 40-8' by a predetermined level. The video main amplifier 40-11 finally amplifies the video signal from the video preamplifier 40-9, and the CRT 40-14 receives the video signal outputted from the video main amplifier 40-11 and displays the received signal.

In operation, if the user mounts the video tape in the VCR 10, the VCR 10 outputs the VCR video signal and the VCR video detecting signal which are recorded in the video tape, respectively. The game machine 20 outputs the game machine video signal and the game machine video detecting signal according to the executed result of the game program, the PC 30 outputs the PC video signal and the PC video detecting signal, respectively and the TV tuner 40-1 outputs the TV video signal and the TV video detecting signal, respectively.

Each of the video detecting signals from the VCR 10, the game machine 20, the PC 30 and the TV tuner 40-1 is detected by the video signal detector 40-2 within the monitor 40. The video signal detector 40-2 senses the video detecting signals from the VCR 10, the game machine 20, the PC 30 and the TV tuner 40-1 and determines what video signal is connected to the current monitor 40 according to the sensed result.

The video detecting signal detected by the video signal detector 40-2 is applied to the microcomputer 40-3. The microcomputer 40-3 outputs the video selection signal according to the applied video detecting signal.

In other words, if the user presses a button which switches the video signal on front function buttons (not shown) which are installed on a monitor external case, in order for him to watch a desire video screen, a button signal is outputted from the button. The microcomputer 40-3 receives the button signal and outputs the video selection signal according to the video detecting signal sensed by the button signal.

At this time, if the video signal detector 20 detects the TV video signal from the TV tuner 40-1, the video signal detector 20 applies the detected TV video signal to the microcomputer 40-3. Next, the microcomputer 40-3 applies the video selection signal according to the applied TV video detecting signal to the video composite signal selector 40-5. Then, the video composite signal selector 40-5 receives the TV video signal applied from the TV tuner 40-1.

As a result, the video composite signal selector 40-5 receives the TV video selection signal applied from the microcomputer 40-3 and outputs the TV video signal. The chrominance of the TV video signal is adjusted by the chroma IC 40-6. The chroma IC 40-6 applies the adjusted TV video signal to the video signal switching circuit 40-8'. Then, the video signal switching circuit 40-8' receives the video selection signal according to the TV video signal applied from the microcomputer 40-3 and outputs the TV video signal.

The TV video signal outputted from the video signal switching circuit 40-8' is applied to the video preamplifier 40-9 and is then amplified by a predetermined level. The amplified TV video signal is finally amplified by the video main amplifier 40-11 and is then applied to the CRT 40-14. Next, the CRT 40-14 displays the video signal according to the TV video signal on the monitor screen, such that the user can watch the TV program.

On the other hand, if the TV video signal is not detected from the video signal detector 40-2, the microcomputer 40-3 outputs the OSD data according to the TV video signal. In other words, the microcomputer 40-3 produces the OSD data indicating the TV video signal is not detected during a predetermined time period. The OSD data is applied to the OSD circuit 40-4. The OSD data, which receives the OSD data, precesses the received OSD data to thereby generate the OSD gain signal.

The OSD gain signal generated from the OSD circuit 40-4 is amplified by the video preamplifier 40-9 up to a predetermined level and is then applied to the video main amplifier 40-11. The video main amplifier 40-11, which receives the OSD gain signal, finally amplifies the received OSD gain signal and then applies the amplified signal to the CRT 40-14.

Next, the CRT 40-14 displays the OSD signal on the monitor screen. That is, a message indicative of "TV video signal detection error" is displayed on the monitor screen during a predetermined time period. When the user watches the monitor screen containing the OSD message, he checks whether the TV tuner 40-1 is normally operated.

In the same manner, as the TV video signal and the TV video detecting signal, the VCR video signal and the VCR video detecting signal outputted from the VCR 10 are displayed on the monitor screen.

On the other hand, the game machine video signal outputted from the game machine 20 and the PC video signal are applied to the video signal switching circuit 40-8'. Further, the video signal detector 40-2, which receives the game machine video detecting signal and the PC video detecting signal, outputs the video selection signal according to the applied video detecting signals.

The microcomputer 40-3 receives the game machine video detecting signal and the PC video detecting signal from the video signal detector 40-2 and outputs the video selection signal according to the applied video detecting signals. Next, the video signal switching circuit 40-8' receives the video selection signal from the microcomputer 40-3 and outputs the video signal according to the applied video selection signal.

For instance, if the game machine video selection signal is applied form the microcomputer 40-3, the video signal switching circuit 40-8' outputs the game machine video signal applied to the game machine 20. On the other hand, if the PC video selection signal is applied from the microcomputer 40-3, the video signal switching circuit 40-8' outputs the PC video signal applied to the PC 30.

The game machine video signal and the PC video signal are amplified by the video preamplifier 40-9 and the video main amplifier 40-11 and is then applied to the CRT 40-14. Finally, the CRT 40-14 displays the game machine video signal and the PC video signal.

On the other hand, if the VCR video detecting signal, the game machine video detecting signal and the PC video detecting signal are not detected by the video signal detector 40-2, in the same manner as the TV video detecting signal, a signal detection error message is displayed on the OSD screen. In more detail, a message indicative of "VCR video signal detection error", "game machine video signal detection error", or "PC video signal detection error" is displayed. From this, the user checks whether a jack or a connector for connection of the video signals outputted from the VCR 10, the game machine 20 and the PC 30 is well connected.

Now, a construction and operation of the video signal detector 40-2 will be in detail discussed with reference to FIG. 4.

FIG. 4 is a detailed circuit diagram illustrating the video signal detector 40-2 of FIG. 3. As shown in FIG. 4, there are provided a terminal "T1" which receives the TV video signal and outputs the received TV video signal, a terminal "T2" which receives the VCR video signal and outputs the received VCR video signal, a terminal "T3" which receives he game machine video signal and outputs the received game machine video signal, a terminal "T4" which receives the PC video signal and outputs the received PC video signal, a terminal "T1" which receives the horizontal/vertical synchronous signals H/V-SYNC and outputs the received horizontal/vertical synchronous signals H/V-SYNC, the video signal detector 40-2 which senses the video signal outputted from each of the terminals T1, T2, T3, T1 and T1 and outputs the sensed video detecting signal, a button 40-3-1 which outputs a button signal for selecting a video switching function, the microcomputer 30-3 which receives the button signal and outputs the OSD data according to the video detecting signal applied from the video signal detector 40-2 and the OSD data, and the OSD circuit 40-4 which receives the OSD data from the microcomputer 40-3 and outputs the OSD gain signal according to the received OSD data.

Under the above construction, the video signal detector 40-2 is comprised of a first transistor Q1 which amplifies the weak TV video signal to detect the TV video signal, a second transistor Q2 which amplifies the weak VCR video signal to detect the VCR video signal, a plurality of resistors R1 to R4, and a plurality of capacitors C1 to C4.

In operation, the TV video signal applied from the terminal T1 is applied to the base terminal of the first transistor Q1 through a low-pass filter comprised of the capacitor C1 and the resistor R1. The first transistor Q1 amplifies the applied weak TV video signal and then outputs the amplified signal to its own collector terminal.

In this case, the capacitors C2 and C3 are each used for a smoothing purpose, and a direct current voltage V is used as a driving voltage of the first and second transistors Q1 and Q2. The TV video signal applied to the terminal T1 is amplified by the first transistor Q1 and is then applied to the microcomputer 40-3.

Meanwhile, the VCR video signal applied from the terminal T2 is applied to the base terminal of the second transistor Q2 through a low-pass filter comprised of the capacitor C4 and the resistor R3. The second transistor Q2 amplifies the applied weak VCR video signal and then outputs the amplified signal to the microcomputer 40-3.

Also, the game machine video signal, the PC video signal, the horizontal/vertical synchronous signals II/V-SYNC each applied from the terminals T3, T1 and T1 are applied to the microcomputer 40-3. Next, the microcomputer 40-3 receives the button signal applied from the button 40-3-1 and outputs each of the video signals.

That is, the microcomputer 40-3 outputs the video signal selected by the button 40-3-1. At the time, if the selected video signal is not applied to the microcomputer 40-3, the microcomputer 40-3 generates the OSD data, which is applied to the OSD circuit 40-4. Next, the OSD circuit 40-4 processes the applied OSD data to thereby output the OSD gain signal. The OSD gain signal is displayed on the CRT 40-14, to thereby inform the user of the fact that the selected video signal is not sensed.

When the video signal is not detected, the OSD circuit 40-4 generates the signal detection error message. The construction of the OSD circuit will be in detail discussed with reference to FIG. 5.

Figure 5:
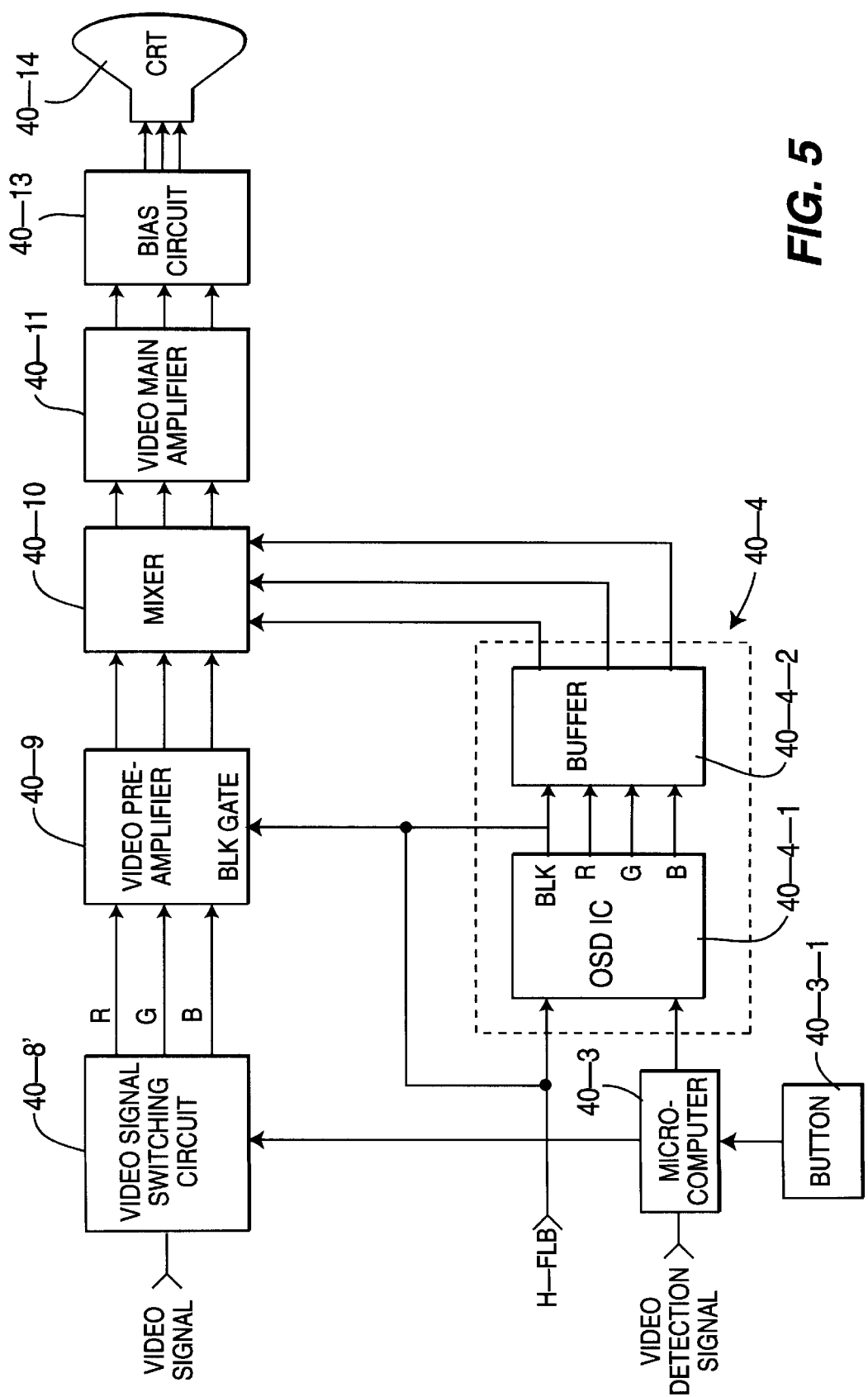
FIG. 5 is a detailed block diagram illustrating an on screen display (OSD) circuit of FIG. 3.

FIG. 5 is a detailed block diagram illustrating the OSD circuit of FIG. 3. In construction, there are provided the button 40-3-1 which is used for selecting the OSD function and outputs the button signal, the microcomputer 40-3 which generates the OSD data according to the applied video detecting signal and the button signal by the OSD function selection applied from the button 40-3-1, the video signal switching circuit 40-8' which selectively outputs the video signal according to the video selection signal applied from the microcomputer 40-3, an OSD IC 40-4-1 which performs the OSD data outputted from the microcomputer 40-3 in the OSD process to thereby output the OSD gain signal and receives a horizontal flyback signal H-FLB to thereby output the OSD gain signal according to the level of the applied the horizontal flyback signal H-FLB, a buffer 40-4-2 which receives the OSD gain signal from the OSD IC 40-4-1 and temporarily stores the OSD gain signal to delay the signal output, the video preamplifier 40-9 which receives the video signals (R, G and B) outputted from the video signal switching circuit 40-8' and amplifies the video signals by a predetermined level according to the levels of the horizontal flyback signal H-FLB and a blanking signal BLK applied from the OSD IC 40-4-1, a mixer 40-10 which receives the video signals (R, G and B) outputted from the video preamplifier 40-9 and the OSD gain signal stored in the buffer 40-4-2 and synthesizes the signals, the video main amplifier 40-11 which finally amplifies the video signals (R, G and B) outputted from the mixer 40-10 and the OSD gain signal, a bias circuit 40-13 which receives the video signals (R, G and B) and the OSD gain signal from the video main amplifier 40-11 and biases the signals with a predetermined voltage; and the CRT 40-14 which receives the video signals (R, G and B) and the OSD gain signal from the bias circuit 40-13 and displays the signals.

In operation, if the user selects the button 40-3-1 having the video signal switching function to select a desired program, the button 40-3-1 outputs the button signals according to the video signal switching function.

Then, the button signal is applied to the microcomputer 40-3, which generates the OSD data according to the video detecting signal by the applied button signal. The OSD data is applied to the OSD IC 40-4-1 within the OSD circuit 40-4 and is then processes as the OSD gain signal.

On the other hand, the video signal selected according to the video selection signal applied to the microcomputer 40-3 is outputted as the video signals (R, G and B).

The video preamplifier 40-9 controls the output of the video signals (R, G and B) according to the levels of the horizontal flyback signal H-FLB delayed from a horizontal retrace pulse and the blanking signal outputted from a blanking gate terminal of the OSD IC 40-4-1.

In other words, if a signal of a logic "low" level is applied to a blanking gate terminal BLK GATE of the video preamplifier 40-9, the interior of the video preamplifier 40-9 is in the logic "low" state, that is, a data value "0", to thereby cut off the output of the video signals (R, G and B). To the contrary, if a signal of a logic "high" level is applied to the blanking gate terminal BLK GATE of the video preamplifier 40-9, the interior of the video preamplifier 40-9 is in the logic "high" state, that is, a data value "1", to thereby output the video signals (R, G and B).

When the video preamplifier 40-9 is in the logic "high" state, the video signals (R, G and B) are finally amplified in the video main amplifier 40-11 and are then applied to the CRT 40-14. The video according to the video signals (R, G and B) is displayed on the CRT 40-14. Contrarily, if the blanking signal outputted from the blanking gate terminal BLK of the OSD IC 40-4-1 and the horizontal flyback signal H-FLB are in the logic "high" state, the interior of the video preamplifier 40-9 is in the logic "lo" state, that is, the data value "0", to thereby cut off the output of the video signals (R, G and B).

If the output of the video signals (R, G and B) is cut off by the video preamplifier 40-9 in a mute state, the buffer 40-4-2, which temporarily stores the OSD R, G and B gain signals outputted from the output terminals R, G and B of the OSD IC 40-4-1, applies the stored OSD R, G and B gain signals to the mixer 40-10. Next, the mixer 40-10 synthesizes the video signals (R, G and B) amplified by the video preamplifier 40-9 and the OSD R, G and B gain signals and outputs the synthesized signals.

The outputted OSD R, G and B gain signals are finally amplified by the video main amplifier 40-11. The amplified OSD signals are biased at a predetermined level through the bias circuit 40-13 and are then applied to the CRT 40-14. Then, the CRT 10-14 displays the applied OSD signals.

In the case where the video signal selected by the user is not displayed on the monitor screen through the above process, a message indicative of "video signal detection error" is displayed.

As mentioned above, an explanation of the operations of the button 40-3-1 for selecting the video signal and displaying the information of the selected video signal and external connectors for connecting the video signals applied from the VCR 10, the game machine 20 and the PC 30 will be discussed with reference to FIG. 6.

Figure 6:
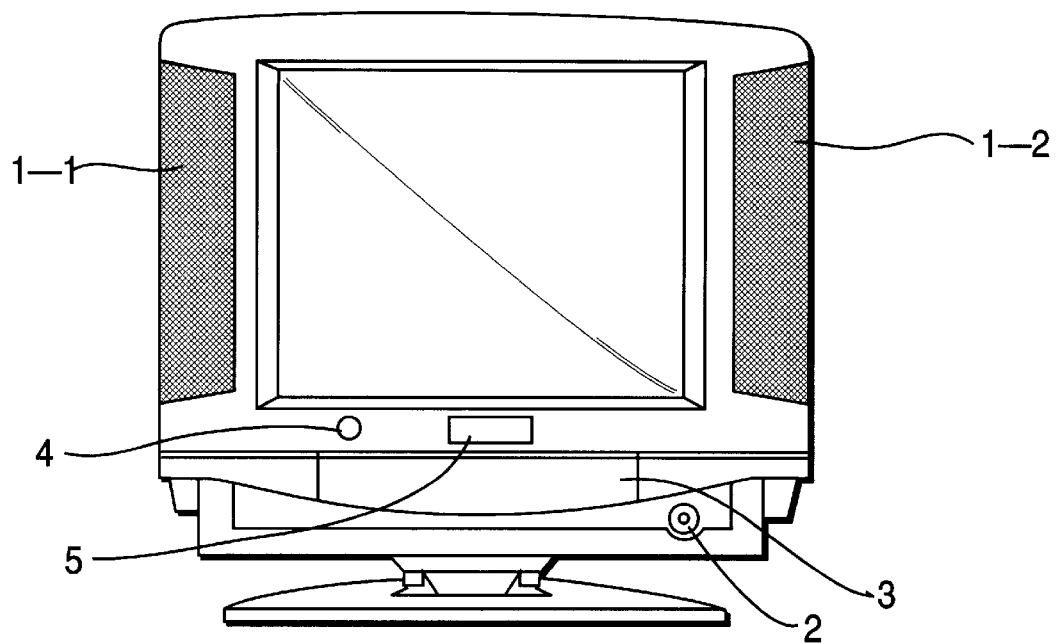
FIG. 6 is a front view illustrating the front appearance of a monitor constructed according to the present invention.

FIG. 6 is a front view illustrating the front t appearance of a monitor constructed according to the present invention. Referring to FIG. 6, on the front surface of the monitor in which first and second speakers 1-1 and 1-2 are installed, there are installed a front control panel 3 which controls the first and second speakers 1-1 and 1-2, a power button 2, and various functions of the monitor. The front control panel 3 is comprised of buttons used for controlling contrast, brightness, monitor screen size control, horizontal/vertical size, horizontal/vertical position and so on. Further, there are installed a button 4 which is used for selecting the video switching function and a remote controller light receiving part 5 which receives the light according to the remote control of the video signal by using the remote controller 50.

Next, an explanation of the terminals used for inputting/outputting the video signals will be discussed with reference to FIG. 7.

Figure 7:
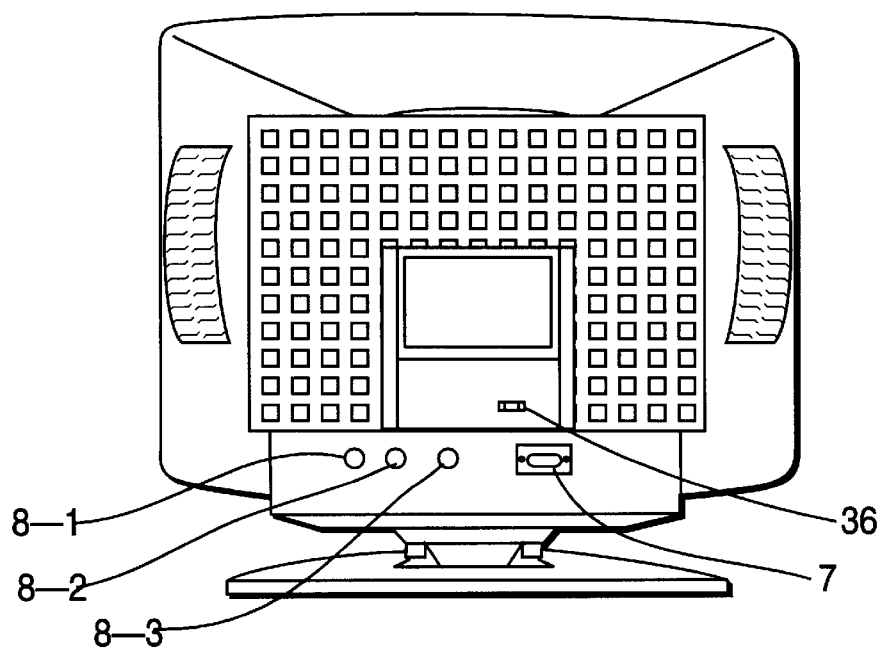
FIG. 7 is a schematic view illustrating the rear appearance of a monitor constructed according to the present invention.

FIG. 7 is a schematic view illustrating the rear appearance of a monitor constructed according to the present invention. Referring to FIGS. 7, a sound input port 6 receives an external sound signal, and a connector 7 receives the PC video signal and the horizontal/vertical synchronous signals H/V-SYNC. Further, if there is installed a sheathing type TV receiving tuner (not shown), a terminal "T1 (8-1)" receives the TV video signal applied from the sheathing type TV receiving tuner. In addition, there are provided a terminal "T2 (8-2)" receives the VCR video signal applied from the VCR 10 and a terminal "T3 (8-3)" receives the game machine video signal applied from the game machine 30.

An explanation of a video signal switching method applied from the above terminals will be in detail discussed with reference to FIG. 8.

Figure 8:
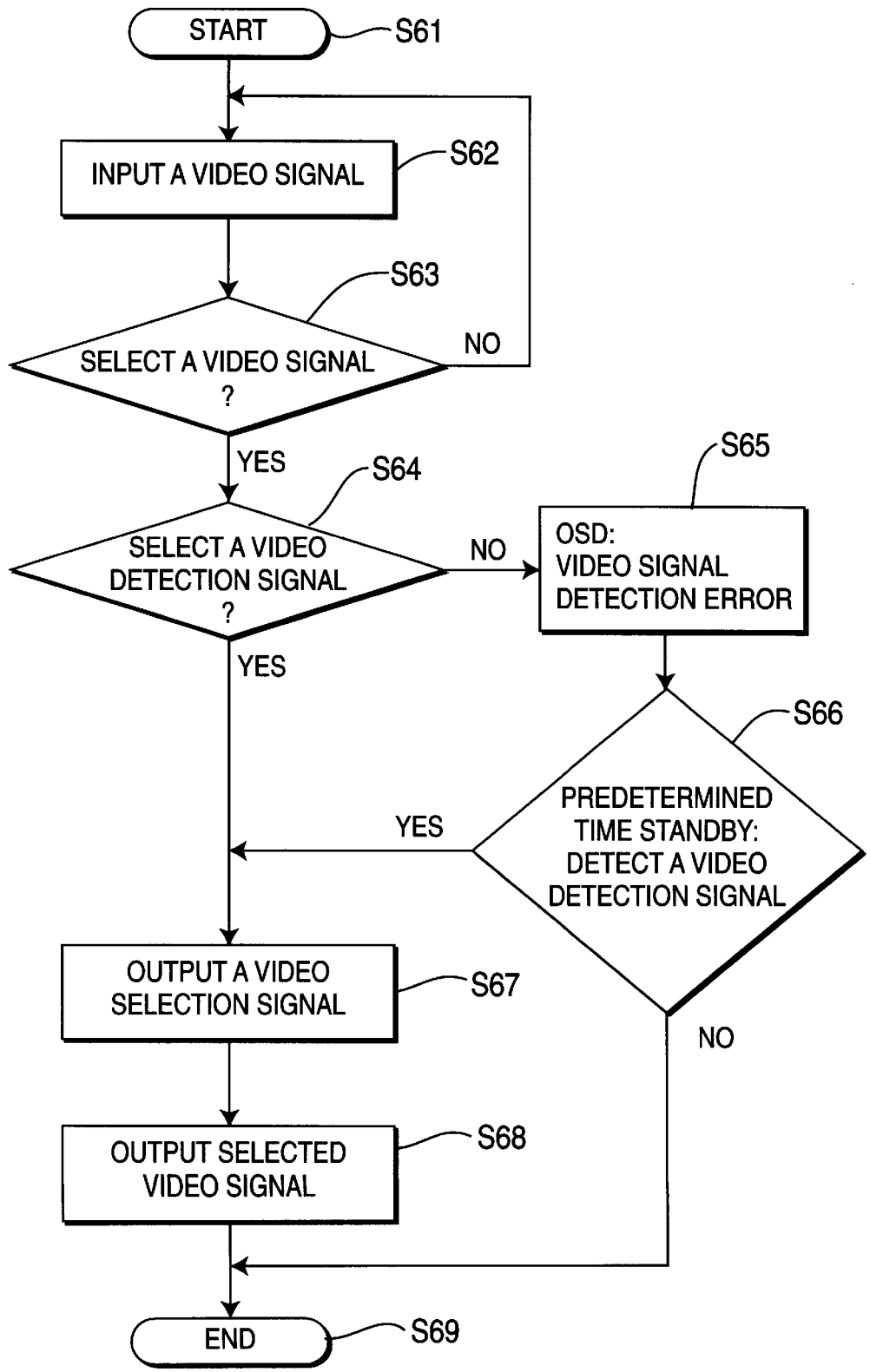
FIG. 8 is a flow chart illustrating a video signal switching method according to the present invention.

FIG. 8 is a flow chart illustrating a video signal switching method according to the present invention. At step S61, the video signal switching process is started, and at step S62, the video signal is connected to the monitor 40 and the video signal is inputted. At step S63, the inputted video signal is selected, and if the user selects a desired video signal, at step S64, it is determined whether the selected video signal is detected. However, if the selected video signal is not detected, a message indicative of "video signal detection error" is displayed on the OSD screen, at step S65. Then after a standby state during a predetermined time period elapses, it is determined whether the selected video signal is detected at step S66. If the selected video signal has been detected at the step S66, the detected video selection signal is outputted at step S67. When the video signal is selected, at step S68 the selected video signal is outputted. If the video selection signal is not detected after the predetermined time period elapses at the step S66, the video signal switching process is completed at step S69.

Referring back to FIG. 3, the video signal switching method will be in detail described.

First, the user uses the remote controller 50 and presses the button mounted on the external case of the monitor 40, in order to watch a desired video signal. At the step S61, the user connects the motion picture reproducing devices such as the VCR 10, the game machine 20 and the PC 30 to the video signal input terminals which are each connected to the monitor 10. If the VCR 10, the game machine 20 and the PC 30 are connected, the video signal detector 40-2 receives the applied video signals, at the step S62.

At the step S62, the VCR video signal, the TV video signal, the game machine video signal and the PC video signal are applied to the video signal switching circuit 40-8'. At the time, the user selects a desired video signal at the step S63.

For example, when the PC video signal is displayed on the monitor 40, the user selects the TV video signal for watching the TV program. At the time, if the PC video signal is not selected, it returns to the step S62. On the other hand, if the TV video signal is selected at the step S63, the selected TV video signal is sensed.

At the step S64, it is determined whether the selected TV video signal is applied from the TV tuner 40-1, and if the TV video signal is normally detected, at the step S67 the TV video selection signal is outputted.

Accordingly, the microcomputer 40-3 outputs the TV video selection signal according to the output video selection signal, and at the step S68 the TV video selection signal is outputted as the TV video signal.

At the time, if the TV video signal is not detected, a message indicative of "TV video signal detection error" is displayed on the OSD screen of the monitor 40, at the step S65. If the message is displayed, the user can determine whether the TV tuner 40-1 is well operated. If the TV tuner 40-1 is out of order or the connection terminals are not well connected, the user can repair the tuner or connect the connection terminals to the monitor 40.

The step S65 is maintained during the predetermined time period at the step S66. After the predetermined time period elapses, if the TV video signal is detected, at the step S67 the TV video selection signal is outputted. Next, the TV video signal is outputted according to the output of the TV video selection signal at the step S68. If the TV video signal output is completed, the video signal switching process is terminated at the step S69. On the other hand, if the video selection signal is not detected at the step S66, the video signal switching process is completed at the step S69.

In the same manner as the TV video signal output, the VCR video signal, the game machine video signal and the PC video signal are outputted.

Now, an explanation of an audio signal selection operation will be given with reference to FIG. 9.

Figure 9:
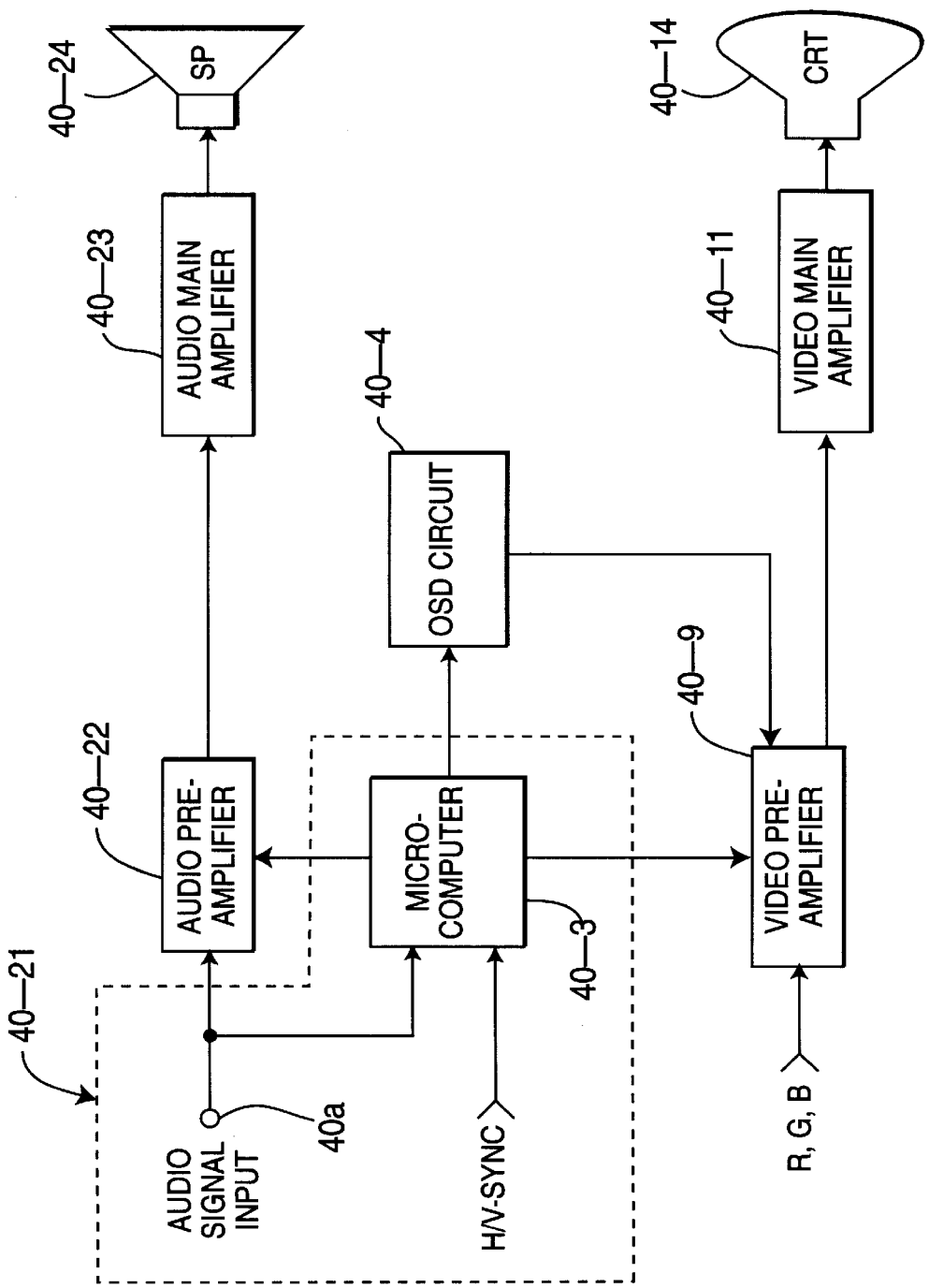
FIG. 9 is a detailed blocked diagram illustrating an embodiment of an audio signal selection means of FIG. 2.

FIG. 9 is a detailed block diagram illustrating an audio signal selection means of FIG. 2. In construction, there are provided an audio input signal sensing jack 40a which is installed within the audio selection means 40-21 and senses the audio signal to output the sensed audio signal, the microcomputer 40-3 within the audio selection means 40-21 which detects the audio signal applied from the audio input signal sensing jack 40a to output the audio selection signal according to the detected audio signal, generates the OSD data according to the audio signal, stores an audio signal control program for controlling the generated OSD data, and receives the horizontal/vertical synchronous signals H/V-SYNC from the PC 30 to output a color gain control signal, the OSD circuit 40-4 which receives the OSD data according to the audio signal outputted from the microcomputer 40-3 and outputs the OSD gain signal, the video preamplifier 40-9 which receives the color gain control signal from the microcomputer 40-3 and receives the video signals (R, G and B) from the PC 30 to amplify the video signals (R, G and B) by a predetermined level, the video main amplifier 40-11 which receives the video signals (R, G and B) from the video preamplifier 40-11 and the OSD gain signal from the OSD circuit 40-4 and finally amplifies the signals, the CRT 40-14 which receives the video signal (R, G and B) and the OSD gain signal outputted from the video main amplifier 40-11 and displays the received signal, the audio preamplifier 40-22 which receives the audio selection signal from the audio signal selection means 40-21 and amplifies the audio signal selected by the audio selection signal by a predetermined level, the audio main amplifier 40-23 which receives the audio signal outputted from the audio preamplifier 40-22 and finally amplifies the audio signal, and the speaker 40-24 which outputs the audio signal outputted from the audio main amplifier 40-23.

In operation, if the audio signals from the PC 30, the TV tuner 40-1 and the VCR 10 are outputted, the audio input signal sensing jack 40a senses the outputted audio signals. The audio signal outputted from the audio input signal sensing jack 40a is sensed by the microcomputer 40-3.

Next, the microcomputer 40-3 within the audio selection means 40-21 executes the stored audio signal control program to thereby output the sensed audio signal. Also, the microcomputer 40-3 receives the horizontal/vertical synchronous signals H/V-SYNC for synchronizing the video signal outputted from the PC 30.

The microcomputer 40-3 outputs the color gain control signal according to the horizontal/vertical synchronous signals H/V-SYNC. The color gain control signal is applied to the video preamplifier 40-9 and controls the color gain of the video signal (R, G and B).

The video preamplifier 40-9 controls the video signal (R, G and B) according to the applied color gain control signal and amplifies the controlled video signal (R, G and B) by the predetermined level. Then, the video main amplifier 40-11 receives the amplified video signal (R, G and B) and finally amplifies the video signal (R, G and B) to output the signals to the CRT 40-14.

On the other hand, the OSD data outputted from the microcomputer 403 according to the audio signal sensing is applied to the OSD circuit 40-4. Next, the OSD circuit 40-4 processes the OSD data to output the OSD gain signal, which is applied to the video main amplifier 40-11.

The OSD gain signal is finally amplified by the video main amplifier 4011 and is displayed on the CRT 40-14. When the user watches the OSD screen, the user can check the audio signal is not detected.

For instance, if the user selects the PC audio signal, the selected PC audio signal is sensed by the microcomputer 403. At the time, if the selected PC audio signal is not sensed, the microcomputer 40-3 outputs the OSD data.

The OSD data is processed by the OSD circuit 40-4 and is outputted as the OSD gain signal. Th Then, the OSD gain signal is amplified to the video main amplifier 4011 and is then displayed by the CRT 40-14. Thereby, the user can check the audio signal is not detected.

To the contrary, if the user selects the PC audio signal, the selected PC audio signal is sensed by the microcomputer 40-3. At the time, the microcomputer 40-3 outputs the PC audio selection signal according to the PC audio signal. The PC audio selection signal is applied to the audio preamplifier 40-22. Then, the audio preamplifier 40-22 amplifies by a predetermined level the PC audio signal applied from the audio input signal sensing jack 40a according to the PC audio signal selection signal.

The audio main amplifier 40-23 receives the PC audio signal from the audio preamplifier 40-22 and finally amplifies the applied PC audio signal to output the signal to the speaker 40-24.

In the same manner as the PC audio signal output, the TV audio signal from the TV tuner 40-1 and the VCR audio signal from the VCR 10 are outputted.

An explanation of the construction of the audio input signal sensing jack 40a will be discussed with reference to FIG. 10.

Figure 10:
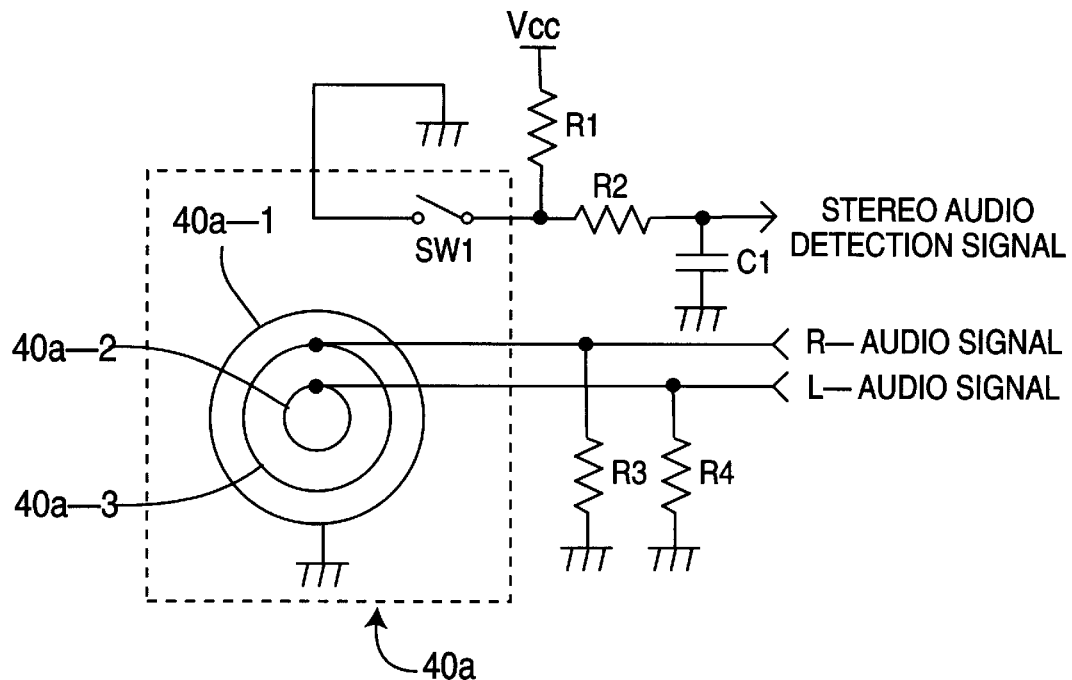
FIG. 10 is a detailed circuit diagram illustrating an audio input signal sensing jack of FIG. 9.

FIG. 10 is a detailed circuit diagram illustrating the audio input signal sensing jack of FIG. 9. Referring to FIG. 10, the audio input signal sensing jack 40a is comprised of an audio input signal sensing jack terminal 40a-1 which receives a stereo audio signal, a first switch SWI which performs a switching operation according to the application of the stereo audio signal to the audio input signal sensing jack terminal 40a-1, a plurality of resistors R1 to R4 and a first capacitor C1.

Within the audio input signal sensing jack terminal 40a-1, there are provided a left-audio signal sensing lead 40a-2 which receives a left-audio signal among the stereo audio signal and a right-audio signal sensing lead 40a-3 which receives a right-audio signal among the stereo audio signal.

In operation, if the audio signals outputted from the PC 30, the VCR 10 and the TV tuner 40-1 are the stereo audio signals, the audio input signal sensing jack terminal 40a-1 receives the outputted stereo audio signals. For example, if the PC left-audio signal is outputted from the PC 30, the left-audio signal sensing lead 40a-2 receives the PC left-audio signal via the impedance matching resistor R3.

If the left-audio signal and the right-audio signal are applied, the first switch SWI of the audio input signal sensing jack 40a is turned on, to thereby output the PC stereo audio signal. Then, the PC stereo audio signal is loaded into a direct current voltage Vcc applied through the resistor R1 and is then outputted through the resistor R2. At the time, the first capacitor C1 is used for removing the noise on the signal.

The PC stereo audio detection signal outputted from the resistor R2 is applied to the microcomputer 40-3. Next, the microcomputer 40-3 executes the audio signal control program and displays the applied PC stereo audio detection signal on the OSD screen. That is, the detected PC stereo audio signal is displayed.

In the same manner as the PC stereo audio signal output, the TV stereo audio signal from the TV tuner 40-1 and the VCR stereo audio signal from the VCR 10 are outputted.

In the case where the PC stereo audio signal, the TV stereo audio signal and the VCR stereo audio signal are mono audio signals, a mono audio input signal sensing jack terminal is embodied. Firstly, an explanation of the construction of a mono audio input signal sensing jack terminal will be discussed with reference to FIG. 11.

Figure 11:
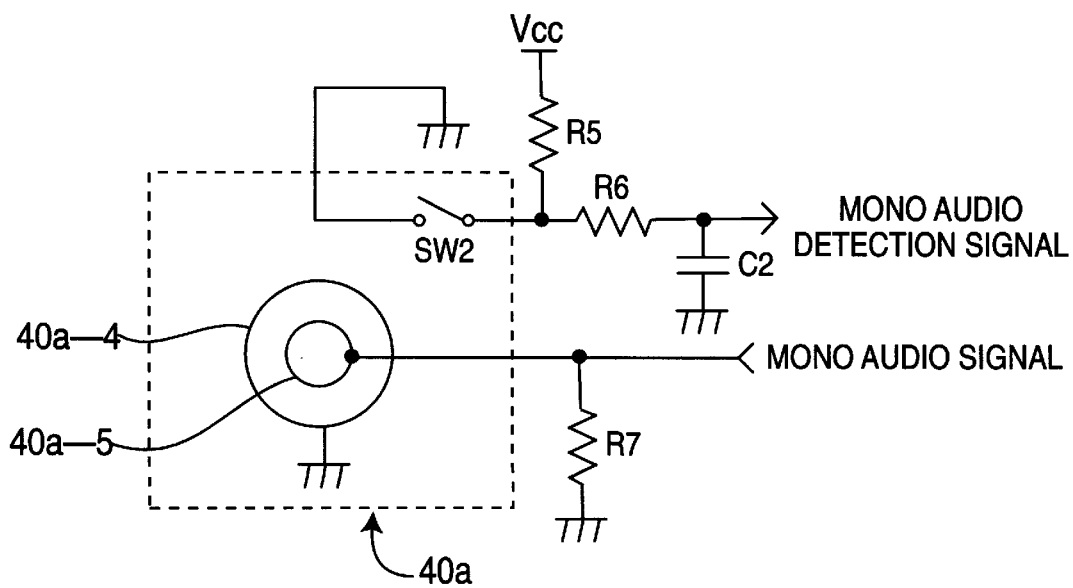
FIG. 11 is a circuit diagram illustrating an embodiment of the audio input signal sensing jack of FIG. 9.

FIG. 11 is a circuit diagram illustrating the embodiment of the audio input signal sensing jack 40a of FIG. 9. In construction, the audio input signal sensing jack 40a is comprised of a mono audio input signal sensing jack terminal 40a-4 which receives a mono audio signal, a second switch SW2 which performs a switching operation according to the application of the mono audio signal to the mono audio input signal sensing jack terminal 40a-4, a plurality of resistors R5 to R7 and a second capacitor C2.

Within the audio input signal sensing jack terminal 40a-1, there is included a mono audio signal sensing lead 40a-5 which receives the mono audio signal.

In operation, if the audio signals outputted from the PC 30, the VCR 10 and the TV turner 40-1 are the mono audio signals, the mono audio input signal sensing jack terminal 40a-4 receives the outputted mono audio signals. For example, if the PC mono audio signal is outputted from the PC 30, the mono audio signal sensing lead 40a-5 receives the PC mono audio signal via the impedance matching resistor R7. If the mono audio signal is applied, the second switch SW2 of the mono audio input signal sensing jack 40a-4 is turned on, to thereby output the PC mono audio signal. Then, the PC mono audio signal is loaded into a direct current voltage Vcc applied through the resistor R5 and is then outputted through the resistor R6. At the time, the second capacitor C2 is used for removing the noise on the signal.

The PC mono audio detection signal outputted from the resistor R6 is applied to the microcomputer 40-3. Next, the microcomputer 40-3 executes the audio signal control program and displays the applied PC mono audio detection signal on the OSD screen. That is, the detected PC mono audio signal is displayed.

In the same manner as the PC mono audio signal output, the TV mono audio signal from the TV tuner 40-1 and the VCR mono audio signal from the VCR 10 are outputted.

An explanation of another embodiment of the audio selection means 40-21 will be discussed with reference to FIG. 12.

Figure 12:
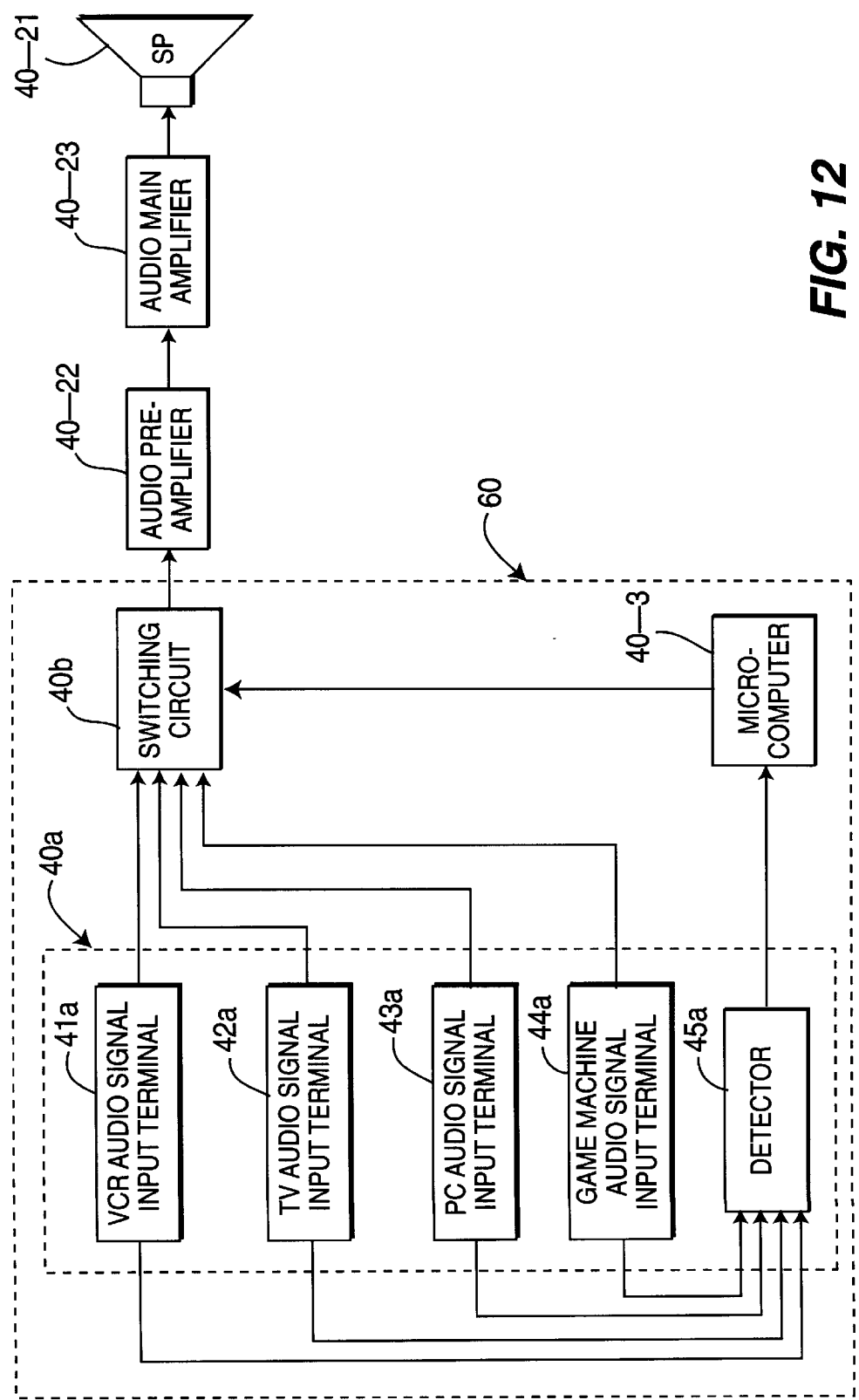
FIG. 12 is a circuit diagram illustrating another embodiment of the audio signal selection means constructed according to the present invention.

FIG. 12 is a circuit diagram illustrating another embodiment of the audio signal selection means constructed according to the present invention. In construction, there are provided a VCR audio signal input terminal 41a which receives the VCR audio signal from the VCR 10, a TV audio signal input terminal 42a which receives the TV audio signal from the TV tuner 40-1, a PC audio signal input terminal 43a which receives the PC audio signal from the PC 30, a game machine audio signal input terminal 44a which receives the game machine audio signal from the game machine 20, a detector 45a which detects the VCR audio signal, the TV audio signal, the PC audio signal and the game machine audio signal, the microcomputer 40-3 which receives the detected audio signal from the detector 45a and stores the audio signal control program for controlling the audio selection signal outputted from the received audio signal, a switching circuit 40b which receives the audio selection signal outputted from the microcomputer 40-3 and switches the audio signal, the audio preamplifier 40-22 which receives the audio signal from the switching circuit 40b and amplifies the audio signal by a predetermined level, the audio main amplifier 40-23 which receives the audio signal outputted from the audio preamplifier 40-22 and finally amplifies the audio signal, and the speaker 40-24 which outputs the audio signal outputted from the audio main amplifier 40-23.

In operation, the VCR 10 reproduces the original recorded on the video tape and outputs the VCR video signal and the VCR audio signal. The VCR audio signal is inputted through the VCR audio signal input terminal 41a to the detector 45a. The TV tuner 40-1 receives a predetermined bandwidth of frequency from the TV receiving antenna 40-1-1 and amplifies the frequency to divide the TV video signal and the TV audio signal. The TV audio signal is inputted through the TV audio signal input terminal 42a to the detector 45a.

The PC 30 in which the program having an audio effect is executed outputs the PC audio signal to the PC audio signal input terminal 43a. The game machine audio signal from the game machine 20 is outputted in accordance with the execution of the game program. The game machine audio signal is inputted through the game machine audio signal input terminal 44a to the detector 45a.

The detector 45a, which receives the audio signals from the VCR 10, the TV tuner 40-1, the PC 30 and the game machine 20, senses the audio signals.

If the detector 45a senses the audio signal, the sensed audio signal is applied to the microcomputer 40-3. Next, the microcomputer 40-3 executes the audio signal control program and applies the audio selection signal according to the detected audio signal to the switching circuit 40b.

Then, the switching circuit 40b selects the detected audio signal. For instance, if the detector 45a senses the VCR audio signal, the microcomputer 40-3 applies the VCR audio selection signal according to the detected VCR audio signal to the switching circuit 40b.

The switching circuit 40b, which receives the VCR audio selection signal from the microcomputer 40-3, selects the applied VCR audio signal and outputs the selected VCR audio signal. In the same manner as the VCR audio signal output, the TV audio signal, the PC audio signal and the game machine audio signal are outputted from the switching circuit 40b.

The selected audio signal by the switching circuit 40b is amplified by the audio preamplifier 40-22 up to the predetermined level. The amplified audio signal is finally amplified by the audio main amplifier 40-23 and is outputted through the speaker 40-24.

An explanation of a first embodiment of the switching circuit 40b will be discussed with reference to FIG. 13A.

Figures 13A, 13B:
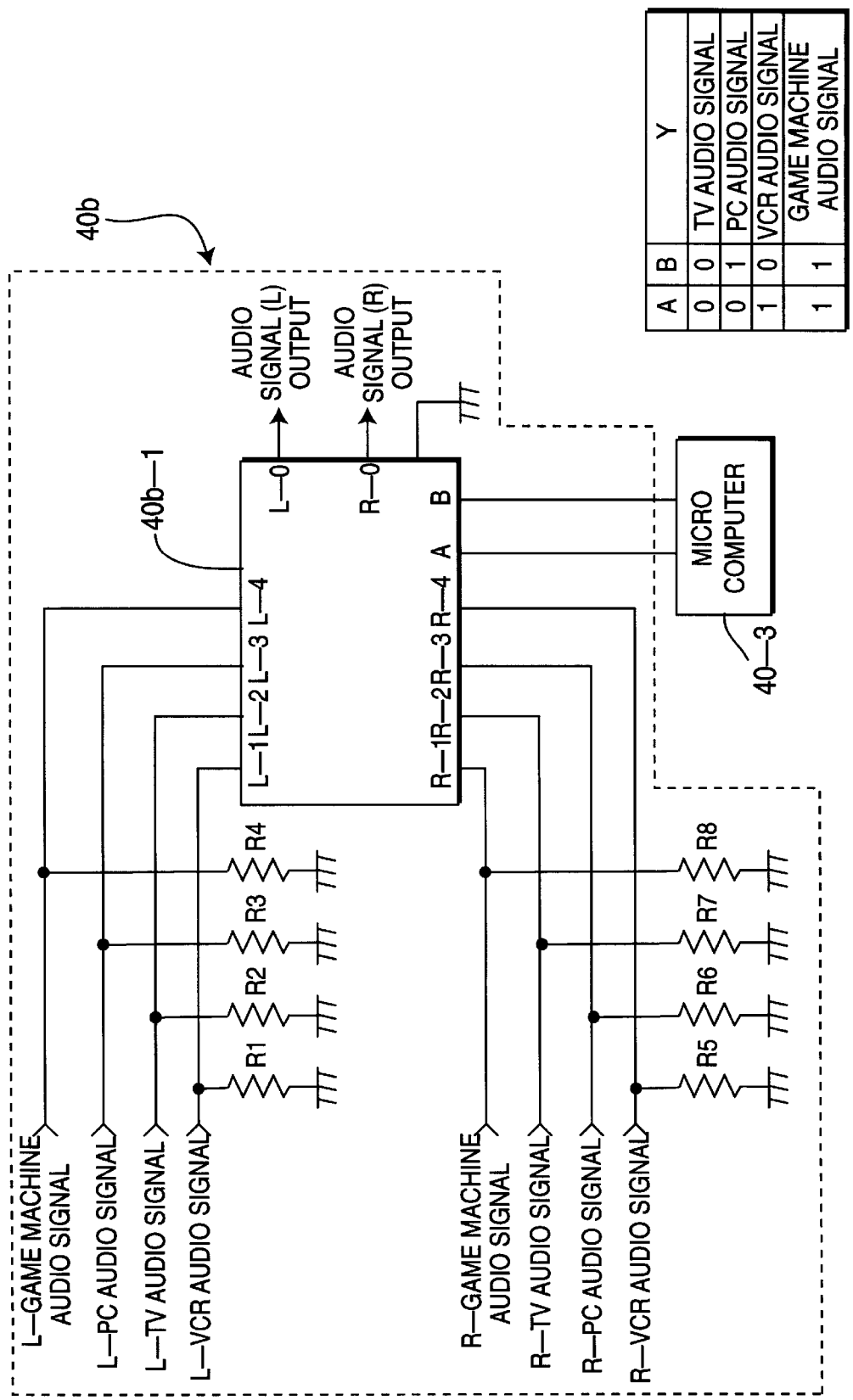
FIG. 13A is a circuit diagram illustrating a first embodiment of a switching circuit of FIG. 12.
FIG. 13B is a logic table illustrating logic signals according to the switching circuit of FIG. 13A.

FIG. 13A is a circuit diagram illustrating a first embodiment of a switching circuit of FIG. 12. Referring to FIG. 13A, there are provided the microcomputer 40-3 which stores the audio signal control program for controlling the audio signal and the switching circuit 40b which receives a logic signal according to the audio selection signal outputted from the microcomputer 40-3 and selects and outputs the audio signal according to the applied logic signal.

Preferably, the switching circuit 40b is comprised of a switching IC 40b-1 which receives the logic signal according to the audio selection signal outputted from the microcomputer 40-3 and selects and outputs the audio signal according to the applied logic signal and a plurality of resistors R1 to R8.

In operation, the audio signal selected by the user is sensed by the microcomputer 40-3, which outputs the logic signal according to the applied audio selection signal. The outputted logic signal is applied to the switching IC 40b-1 within the switching circuit 40b. Next, the switching IC 40b-1 outputs the audio signal according to the logic signal.

For instance, if the VCR audio selection signal is applied to the microcomputer 40-3, the microcomputer 40-3 outputs the logic signal according to the applied VCR audio selection signal. That is, the microcomputer 40-3 outputs the logic signals (0,0) of 2 bits.

Accordingly, the switching IC 40b-1 receives the logic signals (0,0) outputted from the microcomputer 40-3 at the terminals A and B. The switching IC 40b-1, which receives the logic "low" level signals (0,0) at the terminals A and B, receives the L-VCR audio signal and the R-VCR audio signal through the plurality of resistors R1 and R8 and the input terminals "L-1" and "R-1" which are connected in parallel to each other.

The switching IC 40b-1, which receives the L-VCR audio signal and the R-VCR audio signal, outputs the VCR audio signal through its output terminals "L-0" and "R-0". The outputted VCR audio signal is outputted as the L-VCR audio signal through the output terminal "L-0" and outputted as the R-VCR audio signal through the output terminal "R-0".

The L-VCR audio signal and the R-VCR audio signal outputted from the output terminals "L-0" and "R-0" of the switching IC 40b-1 are amplified in the audio preamplifier 40-22 and the audio main amplifier 40-23. The amplifier L-VCR audio signal and the R-VCR audio signal are finally outputted through the speaker 40-24 as the VCR audio signal.

The TV audio signal, the PC audio signal and the game machine audio signal selected by the user are each inputted to the switching IC 40b-1 through the plurality of resistors R2 to R8 and the input terminals "L-2, L-3, L-4, R-2, R-3 and R-4" which are connected in parallel to each other.

The TV audio signal, the PC audio signal and the game machine audio signal applied to the switching IC 40b-1 are outputted through the output terminals "L-0" and "R-0" of the switching IC 40b-1 and are then amplified in the audio preamplifier 40-22 and the audio main amplifier 40-23. The amplified audio signals are finally outputted through the speaker 40-24 as the audio signal.

An explanation of the audio signals outputted from the switching IC 40b-1 according to the logic signal outputted from the microcomputer 40-3 will be discussed with reference to FIG. 13B.

FIG. 13B is a truth table illustrating logic signals according to the switching circuit of FIG. 13A. Referring to FIG. 13B, the audio signals outputted from the switching IC 40-b according to the logic signal outputted from the microcomputer 40-3 are shown. Since the logic signals outputted from the microcomputer 40-3 are connected by 2 bits signal line, the number of audio signal selections are four.

Accordingly, if the logic "low" level signals (0,0) are inputted to the input terminals "A" and "B" of the switching IC 40b-1, the switching IC 40b-1 selects and outputs the VCR audio signal. Meanwhile, if the logic "low" level signal (0) and the logic "high" level signal (1) are each inputted to the input terminals "A" and "B" of switching IC 40b-1, the switching IC 40b-1 selects and outputs the TV audio signal.

Further, if the logic "high" level signal (1) and the logic "low" level signal (0) are each inputted to the input terminals "A" and "B" of the switching IC 40b-1, the switching IC 40-1 selects and outputs the PC audio signal. Finally, if the logic "high" level signals (1,1) are inputted to the input terminals "A" and "B" of the switching IC 40b-1, the switching IC 40b-1 selects and outputs the game machine audio signal.

The audio signals selected through the switching IC 40b-1 are amplified in the audio preamplifier 40-22 and the audio main amplifier 40-23. The amplified audio signals are finally outputted through the speaker 40-24 as the audio signal.

An explanation of a second embodiment of the switching circuit 40b will be discussed with reference to FIG. 14.

Figure 14:
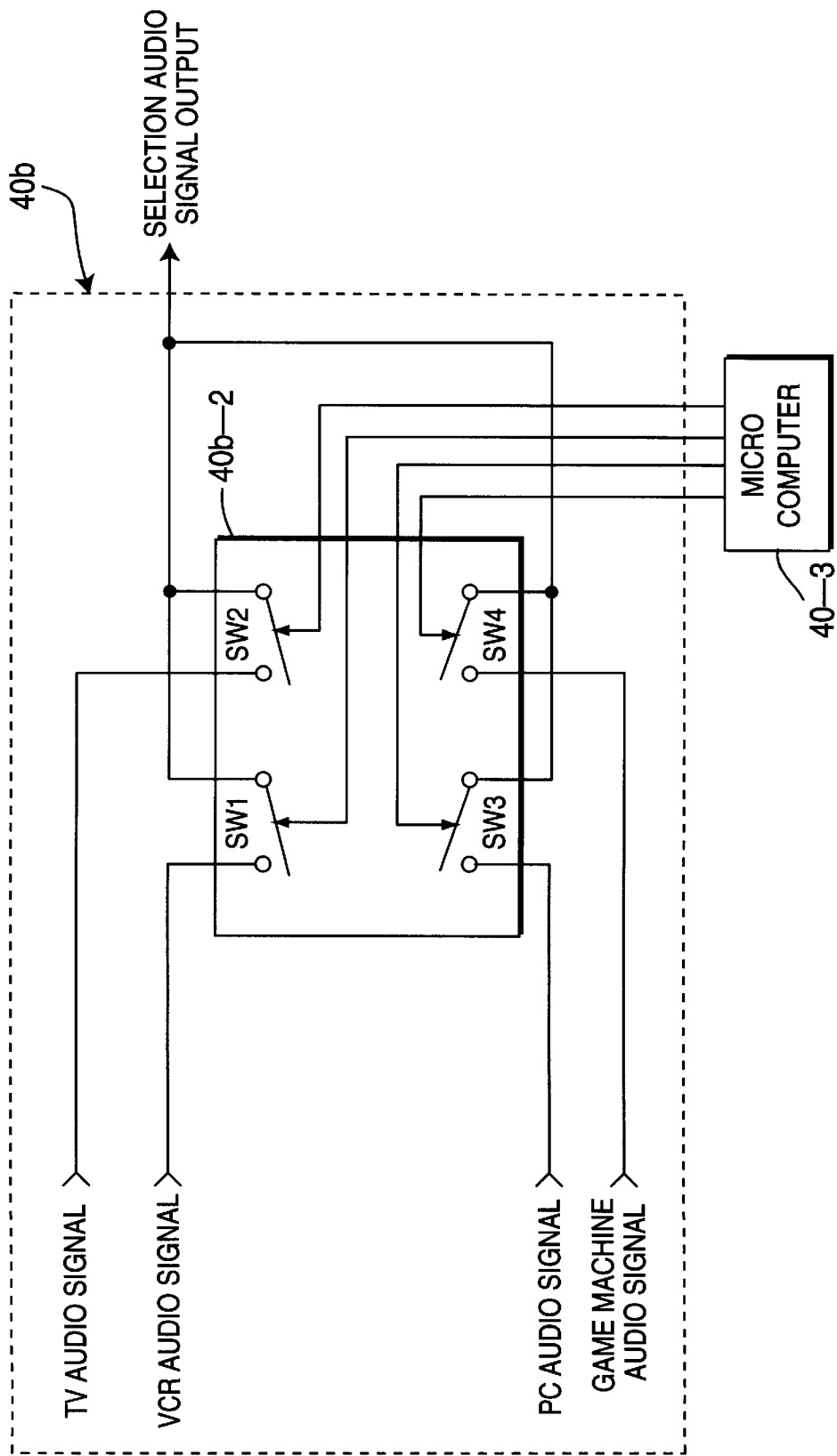
FIG. 14 is a circuit diagram illustrating a second embodiment of a switching circuit of FIG. 12.

FIG. 14 is a circuit diagram illustrating a second embodiment of a switching circuit of FIG. 12. Referring to FIG. 14, there are provided the microcomputer 40-3 which stores the audio signal control program for controlling the audio signal and a switching portion 40b-2 within the switching circuit 40b which receives the audio control signal according to the audio selection signal outputted from the microcomputer 40-3 and selects and outputs the audio signal according to the applied audio control signal.

Preferably, the switching portion 40b-2 is comprised of a first switch SW1 which receives the audio control signal according to the audio selection signal outputted form the microcomputer 40-3 and performs a switching operation according to the applied audio control signal to thereby turn on/off the output of the TV audio signal; a second switch SW2 which receives the audio control signal according to the applied audio control signal to thereby turn on/off the output of the VCR audio signal; a third switch SW3 which receives the audio control signal according to the applied audio control signal to thereby turn on/off the output of the PC audio signal; and a fourth switch SW4 which receives the audio control signal according to the audio selection signal outputted from the microcomputer 40-3 and performs a switching operation according to the applied audio control signal to thereby turn on/off the output of the game machine audio signal.

In operation, the audio signal selected by the user is sensed by the microcomputer 40-3. Next, the microcomputer 40-3 outputs the audio control signal according to the applied audio selection signal.

The outputted audio control signal is applied to the switching portion 40b-2. Next, the switching portion 40b-2 selects the TV, VCR, PC or the game machine audio signal according to the audio control signal.

For example, if the user selects the TV audio signal, the microcomputer 40-3 senses the selected TV audio control signal to the first switch SW1 of the switching portion 40b-2 through a key manipulation signal.

Then, the first switch SW1 is turned on in a normal opening state. When the first switch SW1 is turned on, the switching portion 40b-2 outputs the TV audio signal. The outputted TV audio signal is amplified in the audio preamplifier 40-22 and the audio main amplifier 40-23. The amplified audio signal is finally outputted through the speaker 40-24 as the TV audio signal.

In the same manner as the TV audio signal, the VCR audio control signal, the PC audio control signal and the game machine audio control signal are each turned on through the second to fourth switches SW2 to SW4 and are outputted from the switching portion 40b-2. The outputted VCR audio signal, PC audio signal and game machine audio signal are amplified in the audio preamplifier 40-22 and the audio main amplifier 40-23. The amplified audio signals are finally outputted through the speaker 40-24 as the VCR audio signal, the PC audio signal and the game machine audio signal.

An explanation of an audio signal selection method will be discussed with reference to FIG. 15.

Figure 15:
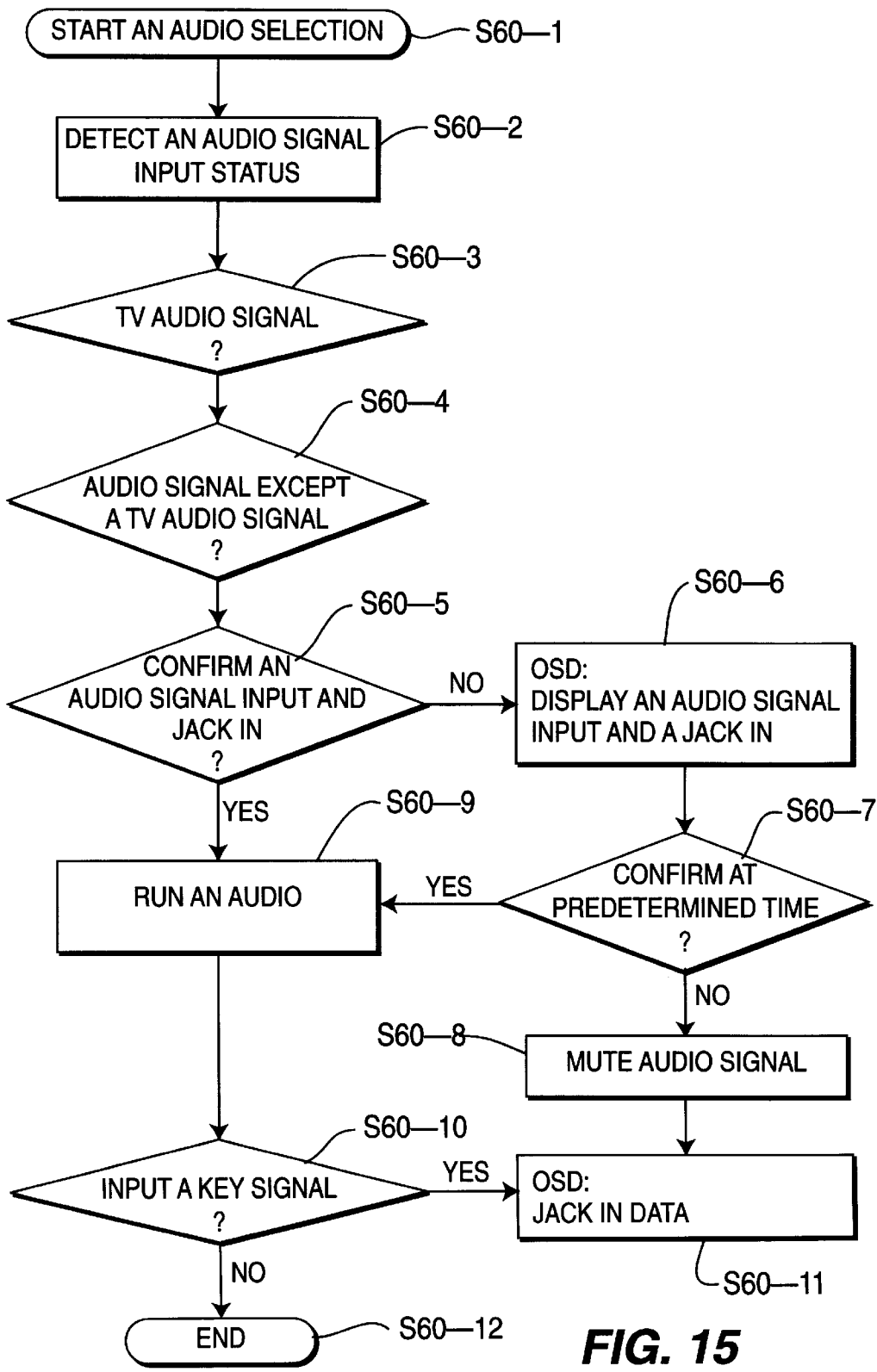
FIG. 15 is a flow chart illustrating an audio signal selection method according to the present invention.

FIG. 15 is a flow chart illustrating an audio signal selection method according to the present invention. At step S60-1, the audio signal selection starts, and if the audio signal is selected, the input state of the selected audio signal is sensed at step S60-2. Then, if the audio signal is sensed at the step S60-2, it is determined whether the sensed audio signal is the TV audio signal at step S60-3. If the audio signal is not the TC audio signal, it is determined whether the audio signal except the TV audio signal is inputted at step S60-4. If the audio signal is the TV audio signal at the step S60-3 and the audio signal except the TV audio signal is inputted at the step S60-4, it is checked whether the audio signal is inputted or whether the audio signal is inputted or whether a jack to which each audio signal is applied is well connected to the monitor at step S60-5. If it is checked that the audio signal is not inputted or the jack is not connected to the monitor at the step S60-5, the audio signal input or jack connection request is displayed on the OSD screen at step S60-6. Next, step S60-7 checks whether the audio signal is inputted or the jack is well connected to the monitor during a predetermined time period. However, if the audio signal is not inputted or the jack is not connected after the predetermined time period elapses, an audio signal mute during which the audio signal is not outputted is executed at step S60-8. Meanwhile, if the audio signal is inputted or the jack is well connected at the step S60-5, the audio signal is executed at step S60-9. During the execution of the audio signal, at step S60-10 it is determined whether a jack in key signal is inputted to check the jack in state. If the jack in key signal is inputted, the jack in data is displayed on the OSD screen at step S60-8. However, if the key signal is not inputted, the audio signal selection process is completed at step S60-12.

In operation, the audio signal is selected at the step S60-1. If the audio signal is selected, the audio signal input state is sensed at the step S60-2. Then, at the step S60-3, it is determined whether or not the sensed audio signal is the TV audio signal.

If the sensed audio signal is not the TV audio signal, it is determined whether the audio signal is the VCR audio signal or the PC audio signal at the step S60-4. If the audio signal except the TV audio signal is determined, it is checked whether the audio signal except the TV audio signal is inputted and whether the jack to which the audio signal is applied is connected at the step S60-5.

If the audio signal is not inputted or the jack is not connected, the audio signal input or the jack in request is displayed on the OSD screen at the step S60-6. For example, a massage indicative of "audio signal input and jack in" is displayed on the OSD screen.

Within the predetermined time period during which the message indicative of "audio signal input and jack in", it is checked whether the audio signal is inputted or the jack is connected to the monitor at the step S60-7. However, if the audio signal is not inputted or the jack is not connected to the monitor after the predetermined time period elapses, the audio signal mute during which the audio signal is not outputted is executed at the step S60-8.

Meanwhile, if the audio signal is inputted or the jack is well connected to the monitor after the predetermined time period elapses at the step S60-7, the audio signal is executed at the step S60-9. When the audio signal is executed, the TV audio signal, the PC audio signal and the VCR audio signal are outputted.

During the outputs of the TV audio signal, the PC audio signal and the VCR audio signal, at the step S60-10 it is determined whether the jack in key signal is inputted to check the jack in state. That is, during the execution of the audio signal, it is checked what audio signal jack is connected to the monitor on the OSD screen.

The key signal input for checking the jack in state outputted from the key manipulation part (not shown) as a monitor control means is sensed at the step S60-10. If the jack in key signal is inputted, the jack in data is displayed on the OSD screen at step the S60-8. That is, it is checked what audio signal jack is connected to the monitor on the OSD screen and hears a desired audio signal. However, if the key signal is not inputted, the audio signal selection process is completed at the step S60-12.

As clearly apparent from the above, a video/audio signal switching circuit and method according to the present invention provides a video signal switching circuit to thereby display is various kinds of video signal by using a monitor.

In addition, a video/audio signal switching circuit and method according to the present invention can selectively output a TV audio signal, a VCR audio signal and PC audio signal in a monitor including TV reception and video functions, to thereby reduce loads of the body of a multimedia computer.

It will be apparent to those skilled in the art that various modifications and variations can be made in a video/audio signal switching circuit and method of the present invention without departing from the spirit or scope of the invention. Thus, it is intended that the present invention cover the modifications and variations of this invention provided they come within the scope of the appended claims and their equivalents.

What is claimed is:

1. A signal switching circuit for a monitor, comprising:
   an audio signal switching circuit; and
   a video signal switching circuit, said video signal switching circuit comprising:
   a video signal detector for outputting a sensed video signal by sensing outputs of a TV video signal from a TV tuner, a VCR video signal from a VCR, a game machine video signal from a game machine and a PC video signal from a PC;
   a microcomputer for receiving the sensed video signal from said video signal detector and horizontal and vertical synchronous signals from said PC to read the received signals, for outputting a video selection signal and generating an OSD data according to the selected video signal;
   a video composite signal selector for receiving and selecting said TV video signal from said TV tuner and said VCR video signal from said VCR and for outputting the selected video signal;
   a chroma IC for receiving the video signal selected form said video composite signal selector and for adjusting chrominance of the synthesized signal;
   a switching circuit for receiving the video signal from said chroma IC, said game machine video signal from said game machine, and said PC video signal from said PC and for switching each of the received video signals according to said video selection signal;
   an OSD circuit for receiving said OSD data according to said video selection signal outputted from said microcomputer and for outputting an OSD gain signal;
   a video preamplifier for selectively amplifying said OSD gain signal outputted from said OSD circuit and said video signal outputted from said switching circuit by a predetermined level;
   a video main amplifier for finally amplifying said video signal from said video preamplifier; and
   a CRT for receiving said video signal outputted from said video main amplifier and for displaying the received signal.

2. The video signal switching circuit as defined in claim 1, wherein said video signal detector is comprised of:
   a first tenninal for receiving said TV video signal to output the received TV video signal;
   a second tenninal for receiving said VCR video signal to output the received VCR video signal;
   a third terminal for receiving said game machine video signal to output the received game machine video signal; and
   a fourth tenninal for receiving said PC video signal to output the received PC video signal.

3. The video signal switching circuit as defined in claim 1, wherein said video signal detector is comprised of a first transistor for detecting said TV video signal and a second transistor for detecting said VCR video signal.

4. The audio signal switching circuit as set forth in claim 1, comprising:
   an audio input signal sensing jack for sensing an audio signal to output the sensed audio signal;
   an audio signal selection means for detecting said audio signal applied forn said audio input signal sensing jack to output an audio selection signal according to the detected audio signal, for generating second OSD data according to said audio signal, for storing an audio signal control program for controlling said second OSD data generated, and for receiving said horizontal/vertical synchronous signals from said PC to output a color gain control signal;
   said OSD circuit receiving said second OSD data according to said audio signal outputted from said audio signal selection means and for outputting a second OSD gain signal;
   said video preamplifier receiving said color gain control signal from said audio signal selection means and receiving said video signals from said PC to amplify said video signals by a predetennined level;
   said video main amplifier for receiving said video signals from said video preamplifier and said second OSD gain signal from said OSD circuit and for finally amplifying the signals;
   said CRT receiving said video signal and said second OSD gain signal outputted from said video main amplifier and for displaying the received signal;
   an audio preamplifier for receiving said audio selection signal from said audio signal selection means to amplify said audio signal selected by said audio selection signal by a predetennined level;
   an audio main amplifier for receiving said audio signal outputted from said audio preamplifier to finally amplify said audio signal; and
   a speaker for outputting said audio signal outputted from said audio main amplifier.

5. The audio signal switching circuit as defined in claim 4, wherein said audio signal selection means is comprised of said audio input signal sensing jack for sensing the audio signal to output the sensed audio signal, and a microcomputer for detecting said audio signal applied from said audio input signal sensing jack to output the audio selection signal according to the detected audio signal, for generating the second OSD data according to said audio signal, for storing the audio signal control program for controlling said second OSD data generated, and for receiving the horizontal/vertical synchronous signals from said PC to output the color gain control signal.

6. The audio signal switching circuit as defined in claim 5, wherein said audio input signal sensing jack is comprised of a first audio input signal sensing jack terminal which receives a stereo audio signal and a second audio input signal sensing jack terminal which receives a mono audio signal.

7. The audio signal switching circuit as set forth in claim 1, comprising:
   a VCR audio signal input terminal for receiving a VCR audio signal from said VCR;
   a TV audio signal input terminal for receiving a TV audio signal from said TV tuner;
   a PC audio signal input terminal for receiving a PC audio signal from said PC;
   a game machine audio signal input terminal for receiving a game machine audio signal from said game machine;
   a detector for detecting said VCR audio signal, said TV audio signal, said PC audio signal and said game machine audio signal;
   said microcomputer for receiving the detected audio signal from said detector and for storing an audio signal control program for controlling an audio selection signal outputted from the received audio signal;
   a second switching circuit for receiving said audio selection signal outputted from said microcomputer and for switching said audio signal;
   an audio preamplifier for receiving said audio signal from said second switching circuit to amplify said audio signal by a predetermined level;
   an audio main amplifier for receiving said audio signal outputted from said audio preamplifier to finally amplify said audio signal; and
   a speaker for outputting said audio signal outputted fonm said audio main amplifier.

8. The audio signal switching circuit as defined in claim 7, wherein said second switching circuit is comprised of a switching IC which receives a logic signal outputted from said microcomputer and selects said audio signal according to the received logic signal.

9. The audio signal switching circuit as defined in claim 7, wherein said second switching, circuit is comprised of a switching portion which receives an audio control signal outputted from said microcomputer and outputs the selected audio signal according to the received audio control signal.

10. The audio signal switching circuit as defined in claim 9, wherein said switching portion is comprised of:
    a first switch for receiving said audio control signal according to said audio selection signal outputted from said microcomputer and for performing a switching operation according to the applied audio control signal to thereby turn on/off an output of said TV audio signal;
    a second switch for receiving said audio control signal according to said audio selection signal outputted from said microcomputer and for performing a switching operation according to the applied audio control signal to thereby turn on/off an output of said PC audio signal; and
    a fourth switch for receiving said audio control signal according to said audio selection signal outputted from said microcomputer and for performing switching operation according to the applied audio control signal to thereby turn on/off an output of said game machine audio signal.

11. A monitor having a switching circuit for selectively receiving video and audio signals from a plurality of video and audio sources, wherein said plurality of video and audio sources comprise a television tuner, a video cassette recorder, a game machine and a personal computer, said switching circuit comprising:
    a video switching circuit for receiving a plurality of video signals from said plurality of video and audio sources, said video switching circuit selectively providing one of said video signals to a display means of said monitor in response to a first switching control signal;
    an audio switching circuit for receiving a plurality of audio signals from said plurality of video and audio sources, said audio switching circuit selectively providing one of said audio signals to an audio output means of said monitor in response to a second switching control signal;
    means for generating a first detection signal by detecting an input video signal from one of said plurality of video signals of said plurality of video and audio sources;
    means for generating a second detection signal by detecting an input audio signal from one of said plurality of audio signals of said plurality of video and audio sources;
    means for generating said first and second switching control signals for controlling said video and audio switching circuits in response to said first and second detection signals;
    a composite video signal selector for selecting a video signal output from one of said television tuner and said video cassette recorder, for separating the selected video signal into its chrominance, luminance and horizontal and vertical synchronous components;
    means for synthesizing said luminance and chrominance components into an RGB video signal or a Y, R-Y and B-Y video signal; and
    means for converting said RGB video signal or said Y, R-Y and B-Y video signal into a monitor video signal having an aspect ratio and frequency suitable for display on said display means of said monitor, said video switching circuit receiving as said plurality of video signals said monitor video signal, a computer video signal from said personal computer and a game video signal from said game machine.

12. The switching circuit as set forth in claim 11, wherein said means for generating said first and second switching control signals comprises:
    a source switch means being selectively positioned in one of a plurality of positions respectively corresponding to said plurality of video and audio sources for outputting a selection signal corresponding to one said plurality of video and audio sources selected by said source switch means; and
    a microcomputer responsive to said selection signal for generating said first and second switching control signals in response to said first and second detection signals.

13. The switching circuit as set forth in claim 12, wherein said microcomputer generates an on-screen display control signal for controlling an on-screen display circuit to output an on-screen display video signal displayable on said display means of said monitor when at least one of said first and second detection signals fails to correspond to said selection signal.

14. A switching method of a monitor having a switching circuit for selectively receiving video and audio signals from a plurality of video and audio sources, wherein said plurality of video and audio sources comprise a television tuner, a video cassette recorder, a game machine and a personal computer, said switching method comprising the steps of:
    receiving, at a video switching circuit, a plurality of video signals from said plurality of video and audio sources, and selectively providing one of said video signals to a display means of said monitor in response to a first switching control signal;

receiving, at an audio switching circuit, a plurality of audio signals from said plurality of video and audio sources, and selectively providing one of said audio signals to an audio output means of said monitor in response to a second switching control signal;

generating a first detection signal by detecting an input video signal from one of said plurality of video signals of said plurality of video and audio sources;

generating a second detection signal by detecting an input audio signal from one of said plurality of audio signals of said plurality of video and audio sources;

generating said first and second switching control signals for controlling said video and audio switching circuits in response to said first and second detection signals;

selectively positioned a button in one of a plurality of positions respectively corresponding to said plurality of video and audio sources for outputting a selection signal corresponding to one said plurality of video and audio sources selected by said button;

generating said first and second switching control signals in response to said first and second detection signals and in further response to said selection signal;

selecting a video signal output from one of said television tuner and said video cassette recorder, and separating the selected video signal into its chrominance and luminance components;

synthesizing said luminance and chrominance components into an RGB video signal or a Y, R-Y and B-Y video signal;

converting said RGB video signal or said Y, R-Y and B-Y video signal into a monitor video signal having an aspect ration and frequency suitable for display on said display means of said monitor; and providing said monitor video signal, a computer video signal from said personal computer and a game video signal from said game machine to said video switching circuit as said plurality of video signals.

15. The method as set forth in claim 14, further comprising a step of generating an on-screen display control signal for controlling an on-screen display circuit to output an on-screen display video signal displayable on said display means of said monitor when at least one of said first and second detection signals fails to correspond to said selection signal.

\* \* \* \* \*